May 21, 1968

E. J. DIUZET 3,383,781

TEACHING MACHINE

Filed May 10, 1965

May 21, 1968 E. J. DIUZET 3,383,781
TEACHING MACHINE
Filed May 10, 1965 9 Sheets-Sheet 5
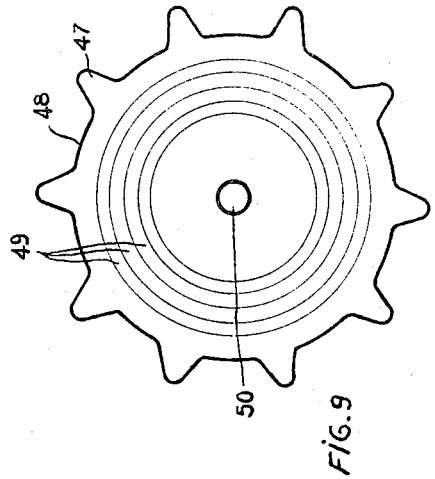
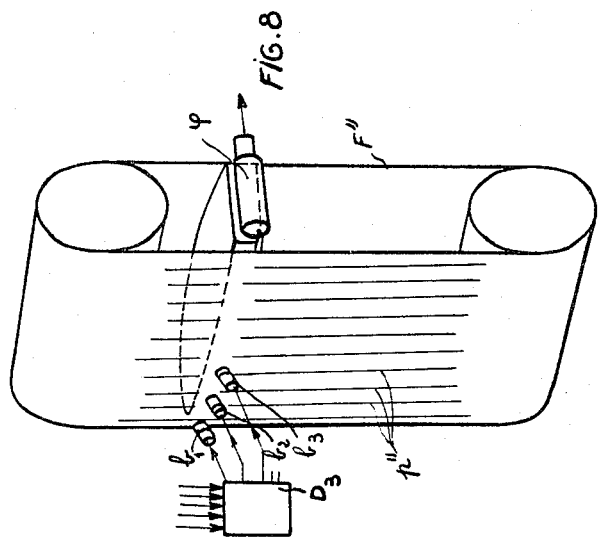
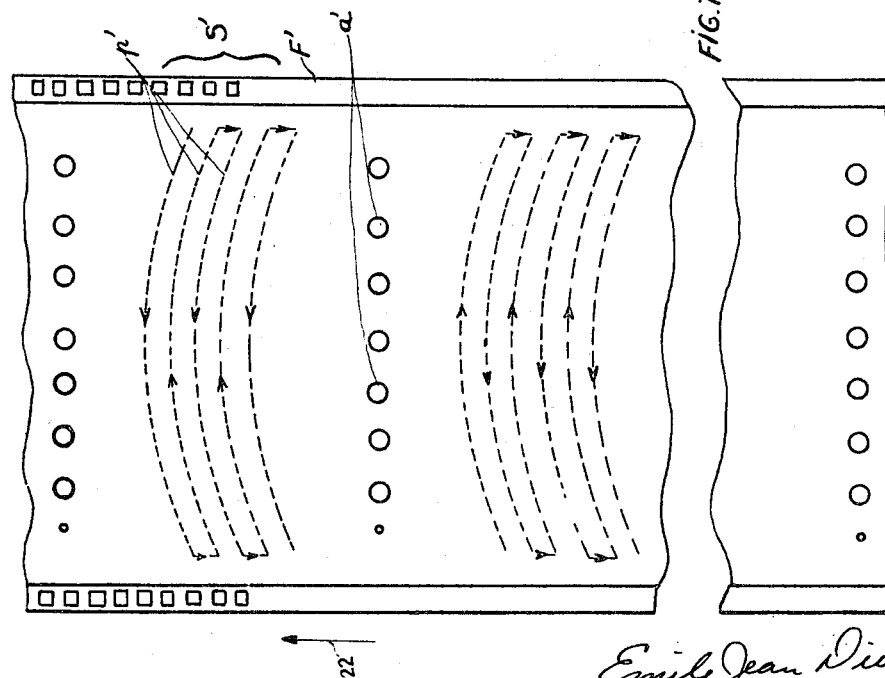
Emile Jean Diuzet,
Inventor
By Wenderoth, Lind and Ponack
Attorneys

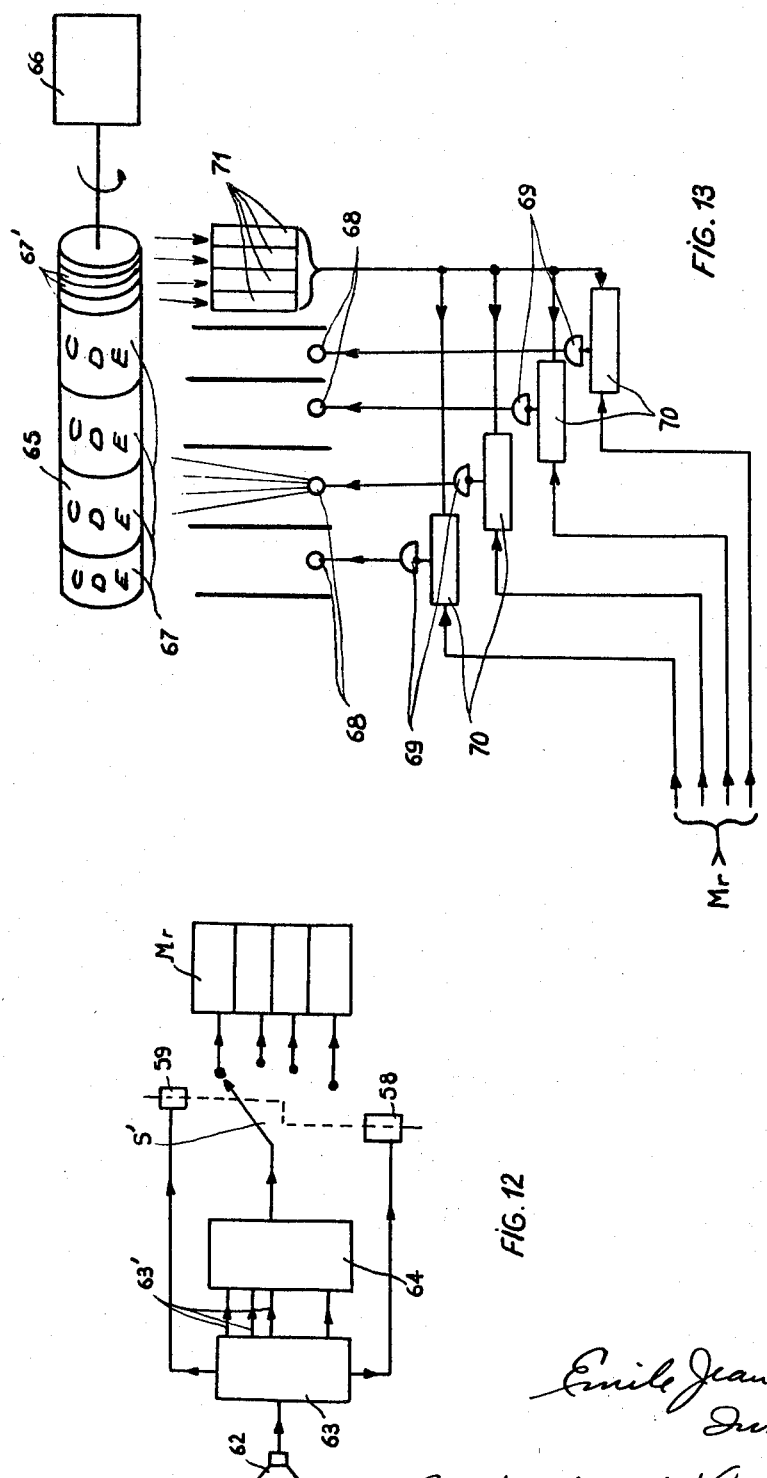

May 21, 1968      E. J. DIUZET      3,383,781

TEACHING MACHINE

Filed May 10, 1965      9 Sheets-Sheet 9

United States Patent Office 3,383,781
Patented May 21, 1968

3,383,781
TEACHING MACHINE
Emile Jean Diuzet, Meudon, France, assignor to Societe Industrielle des Nouvelles Techniques Radioelectriques et de l'Electronique Francaise, Asnieres, France, a French body corporation
Filed May 10, 1965, Ser. No. 454,548
Claims priority, application France, May 15, 1964, 974,754
36 Claims. (Cl. 35—9)

ABSTRACT OF THE DISCLOSURE

In a teaching machine comprising a cinematographic projector and means, for instance a keyboard, for the student entering his answers to questions or problems communicated audiovisually to him, the film in the projector is provided for each program section with an illustration for said section and with coded information comprising the optical recordings, on successive transverse lines of the film, of the proper number of said section, of the various characters of a plurality of standard answers, and of a same plurality plus one of numbers of other sections to be communicated next to the student if his answer is conform or not to one of said standard answers; sensing means and logic means are provided for utilizing this coded information.

---

The invention relates to teaching machines and more particularly to teaching machines which comprise audiovisual means for automatically communicating to the student the subject matter of the lesson and questions or problems enabling it to be ascertained whether the same has been acquired, and also means for storing the student's answers, for comparing them with standard answers and for recording the results of these comparisons.

Teaching machines of the above indicated type are kown. In some of these known machines illustrations of each of the sections into which the teaching programme is divided are recorded photographically so as to be communicated to the student by projecting slides or transparencies; the sound commentaries of the various sections of the programme are moveover recorded on a magnetic tape which is read by a tape recorder, finally, the standard answers with which the student's answers are to be compared are recorded on a punched tape in coded form. The normal progress of the teaching programme is controlled automatically by a sequence device, in particular an electromechanical selector, which must provide more particularly for synchronism of the projection of the illustration of the section of the programme and of the reading of the sound commentary of this same section by the tape recorder and then initiate the search on the punched tape for the standard answers corresponding to this same section and then control the comparison of the student's answer with these standard answers; finally, it must control the logical circuits which appreciate the student's answer and determine the question which must then be put to him as a function of this appreciation. It will be understood that it is difficult to ensure all the functions hereinbefore indicated with perfect synchronism, in particular by means of an electromechanical selector, the operation of which is relatively slow; moreover, the electromechanical technology which is employed in these known teaching machines has other drawbacks, which are also well known and which generally cause electronic technologies to be preferred thereto at the present time, in particular that of solid-state electronic devices which moreover permit much higher operating speeds. Another disadvantage of these known machines resides in the fact that each teaching programme necessitates the prior loading of three machines: the slide projector, the tape recorder and the punched tape scanner; these loading operations are obviously rather lengthy and, by reason of the fact that they are moreover tricky and that the machines to be loaded are relatively fragile and costly, it is desirable to entrust them to skilled staff rather than to the students themselves. Finally, these known teaching machines have the disadvantage of presenting the different sections of the programme in a predetermined, and therefore fixed, order, the only mitigating circumstance being that one or more second chance questions can be interposed between the questions of two successive sections of the programme in the event of the student not having answered the first correctly. These known machines therefore do not permit a presentation of the teaching programme or syllabus which is adapted to the abilities of the student, in the sense that an excellent pupil can only be saved the second chance questions, but the whole of the sections of the programme or syllabus is necessarily presented to him in the pre-established order. Such a teaching programme, a so-called linear programme, presents obvious pedagogic disadvantages.

It is the principal object of the invention to provide a teaching machine of the type initially indicated, but which is free from the disadvantages of the machines heretofore produced and to which reference has been made above.

The machine according to the invention comprises a cinematographic projector loaded with a film, successive portions of which, hereinafter and in the appended claims referred to as "fields," respectively allocated to the various sections of the programme in a given order, each carry optical recordings of the illustration of the corresponding section of the programme, as well as coded information comprising the number of the section, at least one standard answer and the numbers of at least two of the later sections of the programme, means being moreover provided for automatically selecting from among the numbers of later sections recorded on the portion of the film allocated to a certain section of the programme, the number of the section to be communicated next to the student as a function of the conformity or non-conformity of his answer to any one of the standard answers recorded on the said portion, and also means for recording the number of the later section selected in this way, for bringing the illustration of this later section into a fixed projection position and for exploiting the coded information which is associated therewith.

In a preferred form of embodiment of the teaching machine according to the invention, the sound or spoken commentary of each section of the teaching programme is recorded on a zone of the field of the film allocated to the section in question, preferably in parallel rectilinear tracks extending across the film practically from one edge to the other; the scanning or reading device for this sound commentary can then be incorporated in the cinematographic projector.

Owing to the fact that, in the case of the machine according to the invention, the information required for the unfolding of the teaching programme is recorded in coded form on the film used for the fixed projection of the illustrations of the various sections of the programme, the device for scanning or reading this coded information can be incorporated in the cinematographic projector; the machine according to the invention therefore does not require the scanning or reading device for the punched tape provided for recording the standard answers which is essential in the known machines hereinbefore mentioned; the need to load such a reading device at the time of the preparation of the programme is also eliminated and this facilitates and accelerates such preparation. In the form of embodiment of the machine according to the invention in which the sound commentaries of the various sections of the programme are also recorded on the cinematographic film, the preparation of the programme is even reduced solely to the loading of the cinematographic projector, which can then be very rapid and, if required, entrusted to the student himself. Moreover, the synchronisation of the various stages of the unfolding or development of the teaching programme is perfect, since the coded information required for the unfolding of the programme is recorded on the same support or base as the illustrations of the various sections of the said programme, as well as, if required, their sound commentaries; the said synchronisation therefore no longer depends on electromechanical devices which operate slowly and relatively unreliably, as has been the case with the known teaching machines previously mentioned. The construction of the teaching machine according to the invention, on the contrary, can resort to an electronic technique, in particular the technique of solid state electronic devices moreover has the advantage of lending itself to the production of groups of easily interchangeable components, such as printed circuits or solid circuits, which considerably facilitates the maintenance and repair of the machine.

Finally, the machine according to the invention has the following essential pedagogic advantage over machines of the same kind produced heretofore: whereas the known machines only permit the realisation of linear teaching programmes, the teaching machine according to the invention adapts the development of the teaching programme to the abilities of each student; this is clearly evident from the fact that the number of the section to be communicated next to the student is selected automatically from among the numbers of later sections which are recorded on that field of the film which is allocated to the section of the programme which has just been communicated to him, and to which he has just replied, as a function of the conformity or non-conformity of his answer to any one of the standard answers. If, for example, his answer has been correct, the number of the later section which is then seelcted automatically to be communicated to him next may differ from the number of the section recorded on the field of the film immediately following; this arrangement enables an excellent pupil to be saved a certain number of the questions provided as the programme unfolds or progresses in order of increasing difficulty.

The present invention also has as object cinematographic films designed for the teaching machine hereinbefore defined; these films are characterised in that their successive fields, allocated respectively to the different sections of the programme, each comprise the optical recordings of the illustration of the corresponding section of the programme and of diverse coded information, as well as, if required, the recording of the sound commentary of the said section.

Other objects and advantages of the invention will be apparent from the following description of specific embodiments.

By way of example, a number of forms of embodiment of the teaching machine according to the invention are described hereinafter and illustrated diagrammatically in the accompanying drawing.

FIGURE 7 shows a portion of a magnetic tape on which the sound commentaries of the various sections of the teaching programme are recorded in another form of embodiment of the machine according to the invention;

FIGURE 8 illustrates another form of embodiment of the device for recording and reading the sound commentaries of the various sections of the teaching programme;

FIGURE 9 shows one of the symbol wheels by means of which the student is to compose his answer and store it;

FIGURE 12 is a block diagram of an arrangement enabling the student to compose his answer by the transmission of coded vocal sounds;

FIGURE 13 is a block diagram of a stroboscopic arrangement for displaying the student's answer;

Figure 1:
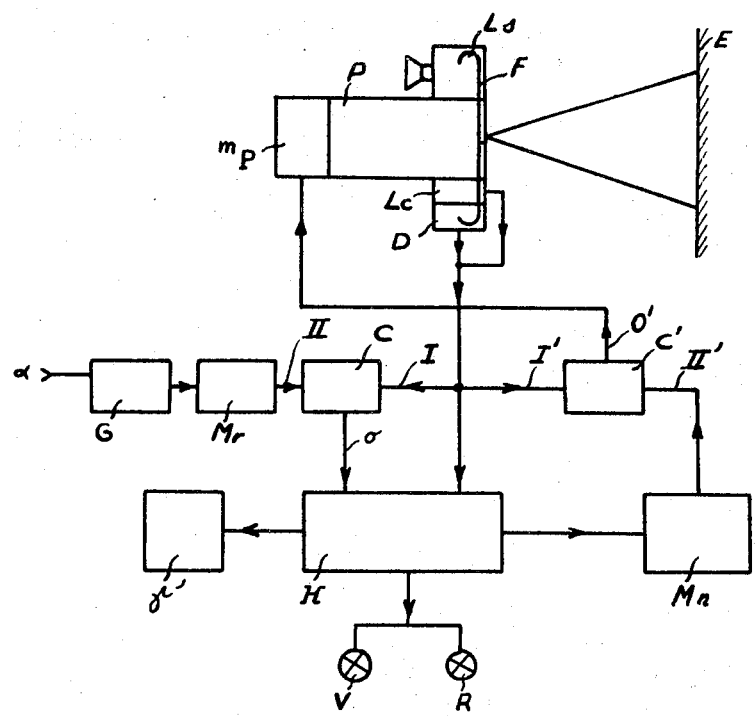
FIGURE 1 is a functional diagram of the teaching machine according to the invention.
Figure 2:
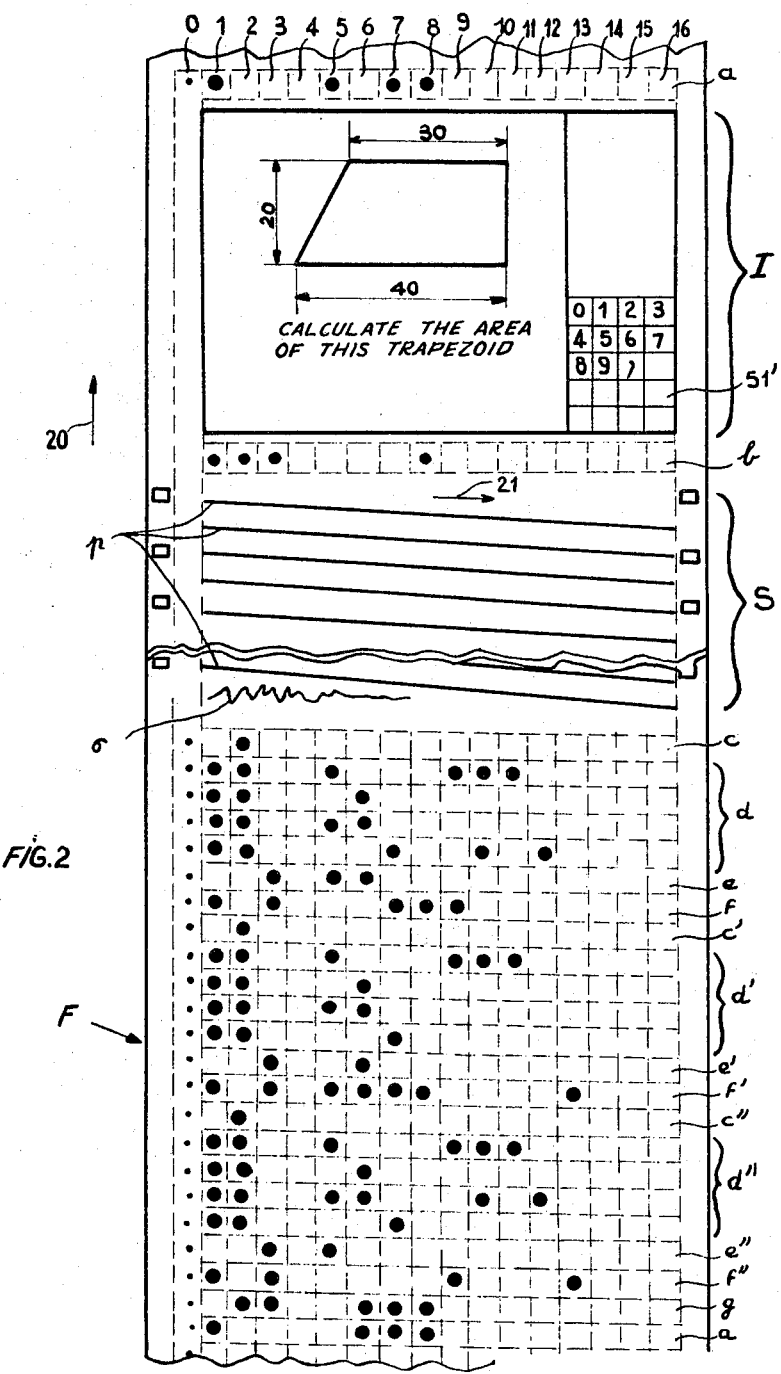
FIGURE 2 shows a field or portion of the film with which the cinematographic projector of the machine according to the invention is loaded, this figure corresponding to the form of embodiment in which the sound commentaries of the sections of the teaching programme are recorded on the same film as the illustrations of the said sections and the coded information which is associated therewith.

The teaching machine according to the invention, the functional diagram of which is shown in FIGURE 1, comprises a cinematographic projector P which is loaded with a film F, part of which is shown in FIGURE 2. This film F is subdivided in the direction of its length into successive fields or portions which are respectively allocated, in a given order, to the various sections of the teaching programme which the machine is to communicate or impart. FIGURE 2 shows one of these fields; the front portion of each of these fields (with respect to the direction of advance of the film indicated in FIGURE 2 by the arrow 20) comprises a zone I defined, for example, by a rectangular frame extending transversely over the entire width of the film F, and on which there is recorded optically the illustration of the corresponding section of the programme, which illustration is to be projected in fixed fashion by the projector P for a certain time. In the example illustrated, this illustration I is constituted essentially by the statement of an elementary geometrical problem; it could, however, be preceded by a text and possibly other figures or diagrams constituting at least partially the "lesson" of the programme, the problem of which is only intended to verify assimilation by the student: the illustration could moreover be reserved for the lesson proper, the problem or the question being communicated in this case by the sound means which will be described later on. Generally speaking, the teaching machine according to the invention is used for communicating to the student a series of questions or problems bearing on the various subjects of a given teaching programme, and for determining whether the answers given by the student to these questions or problems agree or do not agree with standard answers, so as to make a check on his knowledge of the subjects of the said programme; as shown by the above example, these subjects can be communicated to the student by the machine itself as its interrogation or questioning programme unfolds, or else they may have been communicated to him prior to this interrogation programme by any other means of instruction (conventional teaching, books, records, television, etc.).

In the example of embodiment of a cinematographic film designed to be used in the machine according to the invention which is illustrated in FIGURE 2, the illustration I of each section of the programme is followed on the corresponding field by the recording of the sound commentary S of the corresponding section; in the example illustrated, this sound commentary is recorded optically along rectilinear tracks p extending across the film F practically from one edge to the other. In view of the special arrangement of these recording tracks, the sound commentary S must be read by a reading device Ls of a special type for optical sound recordings, which is possibly known and which is incorporated in the cinematographic projector P.

The remainder of each field of the film F allocated to a given section of the programme is occupied by information necessary for the unfolding of the programme, which is recorded optically thereon in coded form; in the example illustrated in FIGURE 2, this information is recorded in a digital code in successive transverse lines a, b, c . . . g, in each of which digits 1 to 16 can be recorded, each of which digits is represented, for example, either by an opaque spot of given size standing out against the background of the unexposed film, as in FIGURE 2, or by a small unexposed area of the film, likewise of given size, standing out from the opaque background of the film, which is fully exposed. The method of coding these different kinds of information and the arrangement thereof on the corresponding field of the film F are open to many variations all coming within the scope of the present invention, which is by no means limited to the example of embodiment illustrated in FIGURE 2. This coded information is, however, preferably recorded optically on the film F, whereas the sound commentary S, instead of also being recorded optically, that is to say by variations of the density of blackening of the film, could also be recorded magnetically on tracks of a magnetic material deposited, for example in the pulverulent state, along successive transverse lines of the said film. In this case, the sound commentary would have to be read by a magnetic head incorporated in the projector P and actuated, in known manner, with an oscillatory movement transverse of the direction of advance of the film F. Among the pieces of information necessary for the unfolding of the programme there appear, on each field of the film F, the serial number of the corresponding section of the programme, at least one standard answer to the question or problem associated with this section and the numbers of at least two later sections of the programme, from among which that to be communicated next to the student will be chosen automatically, by means which will be described hereinafter, as a function of the conformity or non-conformity of his answer to the said standard answer.

At the beginning of the unfolding of the programme, the motor $m_p$ of the projector P being at a standstill, the illustration I of the first section of the programme is in position to be projected onto a screen E, while the tracks p of the corresponding sound commentary S are in position to be read by the device $L_s$, the output signals of which actuate a loudspeaker in known manner through the medium of suitable amplifiers. The zones of the said first field of the film in which the coded pieces of information are recorded are also in position to be read by a reading device Lc, which is also incorporated in the projector P and with which there is associated a decoder D which transmits some of these decoded pieces of information to other parts of the machine which will be described hereinafter. When it has been indicated to the student, for example at the end of the reading of the sound commentary, that he may begin to compose his answer and store it in the machine, the said student, if required after a period of reflection of greater or lesser length, records his answer in the machine, and more particularly in the store Mr thereof, by means of an input device G which, for example, may be a keyboard, but which is open to many other forms of embodiment, some of which will be described hereinafter. When the student is satisfied with the answer which he has recorded in the machine, he makes his recording final by the emission of a suitable signal α, following which the elements or date of his answer recorded in the store Mr are transmitted by the ouputs of the latter to the second group of inputs II of a comparator C, the first group of inputs I of which receives, among the coded pieces of information transmitted directly by the reading dveice Lc, the standard answer to the question or problem put to the student. According to whether the answer stored by the student agrees or does not agree with the standard answer, the output o of the comparator C does not transmit or transmits a signal to a logical device H; the latter then actuates a device displaying the quality of the student's answer, this device being constituted for example by two visible signals or indicators V and R of different colours; it allocates to the student's reply a mark which is displayed by a device γ; finally, it transmits to a store Mn the serial number of the section of the programme to be communicated next to the student, which is transmitted to it by the reading device Lc. The outputs of this store Mn are connected to the second group of inputs II' of a comparator C', the first group of inputs I' of which receives from the reading device Lc the serial number of that section of the programme of which the illustration I on the film F is in the projection position in the projector P; as the pieces of information applied to the two groups of inputs I' and II' of the comparator C' are different, the output o' of the said comparator C' produces a signal which is used to start the motor $m_p$ feeding the film F into the projector P. In the course of the advance of the film F, the numbers of the successive sections of the programme are transmitted by the reading device Lc to the group of inputs I' of the comparator C' and the output signal of the latter disappears, causing the stopping of the motor $m_p$ advancing the film, only when the illustration I of the section to be communicated next to the student, the number of which is recorded in the store Mn, is in the projection position in the projector P. Reading of the sound commentary associated with this section then takes place and then recording by the student of his answer in the manner previously described, the unfolding of the programme thereafter continuing automatically, until the end of the film F, by the repetition of the cycle previously described.

Figure 3:
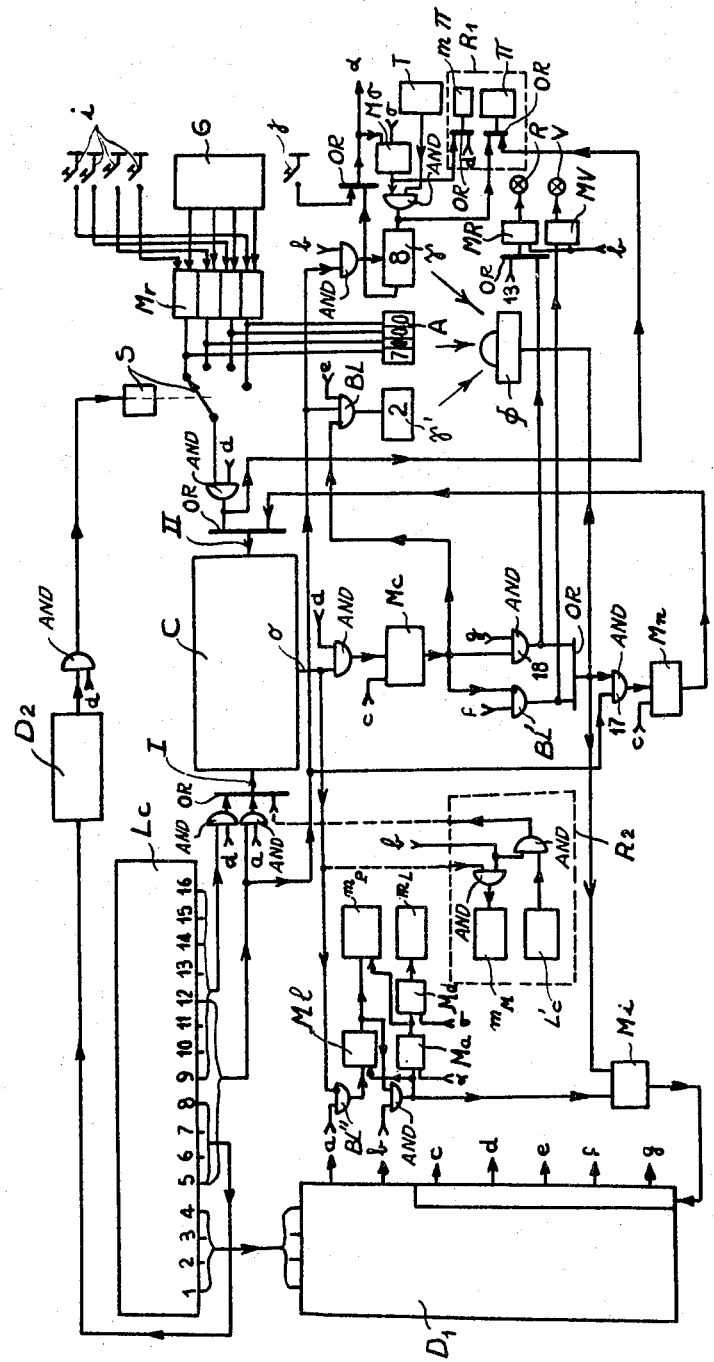
FIGURE 3 is a block diagram of all the various elements of the teaching machine according to the invention.

Some details will now be given concerning the principal elements of the form of embodiment of the teaching machine according to the invention of which a general diagram is shown in FIGURE 3 and which utilizes a cinematographic film such as that of which part is shown in FIGURE 2.

In the case where the sound commentary of each section of the teaching programme is recorded on the cinematographic film itself, in particular optically, in the form of transverse tracks p (FIGURE 2) each having, for example, a constant optical density, but a width varying in rhythm with the sound modulation, there is associated with the reading device Ls for the sound commentary, which is to be incorporated in the cinematographic projector P, a special motor which operates the disengageable driving means of the film in such manner as to cause the various sound tracks p of the film F to pass in front of the reading device in synchronism with the reading of the said tracks. In the example of embodiment of the film F which is illustrated in FIGURE 2, this synchronism results essentially from the fact that each of the sound tracks p of an odd kind begins close to the left-hand edge of the film F in FIGURE 2, substantially level with a perforation in this edge, while each sound track p of an even kind terminates substantially level with a perforation in the right-hand edge of the film F (the arrow 21 indicates in FIGURE 2 the direction in which the sound tracks p are read). Moreover, means are provided in the projector P for immobilizing in the projection position the illustration I of that section of the programme which is in process of being communicated to the student during the reading of the corresponding sound commentary recorded on the part S of the film F; this part S of the film F, which part is then moved along by the motor associated with the reading device for the optical recording of the sound commentary, while the part I of the film F on which the illustration of the section of the programme in question is recorded is immobilized in a fixed projection position, forms a loop which is thereafter taken up when the film advancing motor $m_p$ with which the cinematographic projector P is equipped is restarted, in particular by the signal $\alpha$ which the student transmits to make the recording of his answer final, as will be explained hereinafter in greater detail. The last sound recording track $p$ (with respect to the direction of movement of the film F indicated by the arrow 20 in FIGURE 2) is followed by the recording, which is preferably optical, of a signal $\sigma$, for example of inaudible frequency, which is designed to indicate the end of the sound commentary to means for controlling the stopping of the motor associated with the reading device for the sound commentary, and/or to the disengageable means driving the film.

It has already been indicated that, in the form of embodiment of the film F used in the teaching machine according to the invention which is shown in FIGURE 2, the various pieces of coded information which are recorded optically on each field of the film F allocated to one of the sections of the programme are disposed respectively along the transverse lines $a, b, c, \ldots g$ each extending substantially from one edge of the film F to the other and preferably disposed one after the other; each of these lines $a$ to $g$ is subdivided in the example illustrated into sixteen boxes or spaces 1 to 16, which are defined in FIGURE 2 by broken lines and each of which serves for the optical recording of one digit of the information to be recorded on the corresponding line. The digits which can be recorded in the first four spaces 1 to 4 of each line $a$ to $g$ are used to represent coded references indicating the nature of the information which is recorded, likewise in coded form, in at least some of the spaces 5 to 16 in the same line; each of the said lines $a$ to $g$ is moreover preceded by a space 0 in which a digit is recorded optically, preferably in the form of a spot of a size smaller than that of the spots used to represent the various digits in the different spaces 1 to 16 and the function of which will be indicated hereinafter. It will be assumed hereunder that the various digits recorded in the spaces 0 to 16 of each line $a$ to $g$ are so recorded in the form of clear, unexposed zones or areas standing out from the opaque background, which is fully exposed, of the film F.

Figure 4:
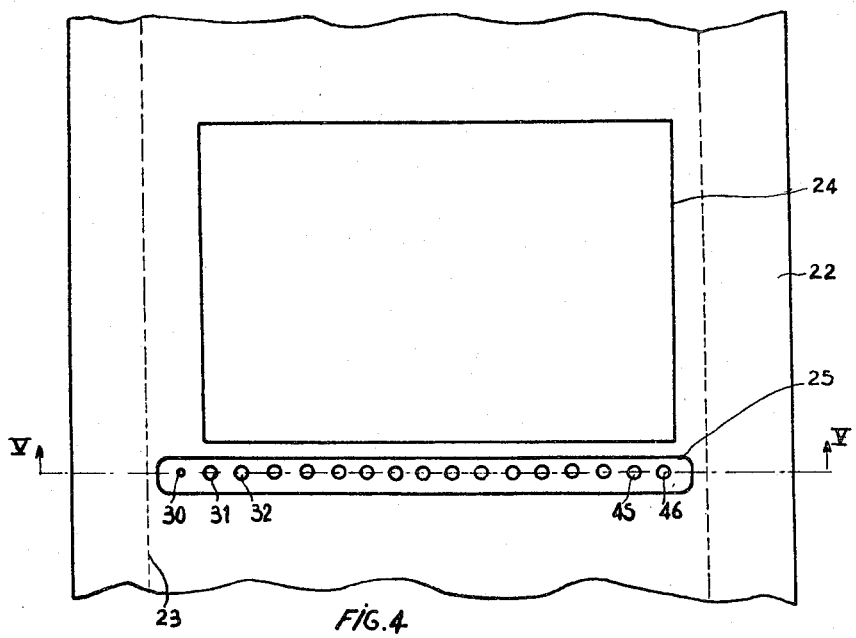
FIGURES 4 and 5 show the reading devices for the film illustrated in FIGURE 2, as seen respectively from the side opposite the film and in section on the line V—V of FIGURE 4.
Figure 5:
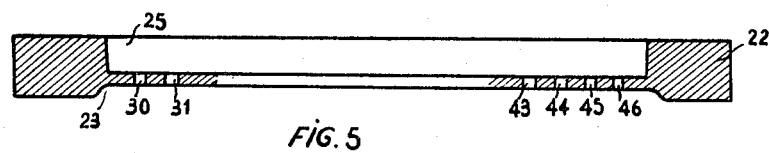
Figure 6:
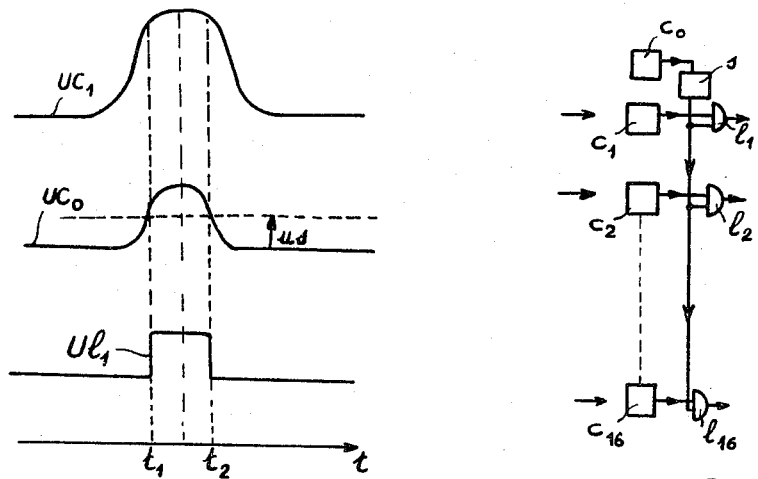
FIGURE 6 is intended to illustrate the operation of the reading device shown in FIGURES 4 and 5.

In the form of embodiment of the teaching machine according to the invention of which FIGURE 3 shows a general diagram, the various pieces of coded information which are recorded on the different lines $a$ to $g$ of each field of the film F are read, and some of them decoded, in succession, due to the continuous advance of the film produced by the motor $m_p$ of the cinematographic projector P, opposite the reading device Lc for the coded information, part of which is shown diagrammatically in FIGURES 4 and 5. These figures show the guide piece 22 for the film, in which there is formed the guide track 23 for the film and also the film gate or projection window 24, the dimensions of which correspond exactly to those of the frame of the illustrations I corresponding to the various sections of the programme, which are recorded on the film F. On that face of the part 22 which is remote from that in which the guide track 23 for the film is formed, a slot of elongated form 25 is formed parallel to the bottom edge of the film gate 24; at the bottom of this slot 25, the guide piece 22 has seventeen holes 30 to 46 aligned parallel to the bottom edge of the film gate 24 and disposed in such manner that, in the course of the passage of the film F through the track 23, the various digits registered optically in the various boxes 0 to 16 of each line $a$ to $g$ pass simultaneously opposite the said holes 30 to 46; the holes 31 to 46 are of substantially the same size and the hole 30 is of a slightly smaller size. In the slot 25 there is fixed a part made of molded material (not shown in FIGURE 5), in which the seventeen photo-electric cells are embedded in such manner that their photo-sensitive surfaces are flush with that face of the said part which is applied against the bottom of the slot 25, opposite the holes 30 to 46 respectively. The outputs of these seventeen photo-electric cells, which are designated by the references $c_1, c_2, \ldots c_{16}$ in FIGURE 6, are connected through the medium of amplifiers, which are not shown in FIGURE 6, to the first inputs of logical AND-circuits $1_1, 1_2, \ldots 1_{16}$, the second inputs which are connected in common to the output of the cell $c_0$ located opposite the hole 30 in the guide part 22, through the medium of a threshold circuit $s$. The diagram shown in the left-hand part of FIGURE 6 shows at $Uc_1$ and $Uc_0$ the variations of the output voltages of the cells $c_1$ and $c_0$ as a function of the time $t$, that is to say as a function of the advance of the film F opposite the reading device for the coded information previously described; owing to the effect of the threshold circuit $s$, the second inputs of the logical circuits $1_1$ to $1_{16}$ receive a signal only when the output voltage of the cell $c_0$ exceeds a certain threshold $u_s$, with the result that the output voltage of each of the cells $c_1$ to $c_{16}$ is transmitted by the output of the associated logical circuit $1_1$ to $1_{16}$ only during the interval of time $t_1-t_2$, during which the said output voltage ($Uc_1$ in FIGURE 6) has a value close to its maximum. The outputs of logical circuits $1_1$ to $1_{16}$ therefore substantially transmit rectangular pulses such as $L1_1$ (FIGURE 6). This arrangement has the advantage of completely eliminating any stray currents which may be received by the reading device Lc for the coded information; when a line of coded information is opposite this reading device, the elimination of the corresponding stray currents results from the fact that the stray currents received by the reading device constituted by the cells $c_1$ to $c_{16}$ outside the brief interval of time $t_1-t_2$ are not transmitted to the outputs of the logical circuits $1_1$ to $1_{16}$, since the latter are blocked outside the brief interval of time mentioned; when another part of the film F, for example a line of the illustration I or of the sound commentary S, is located opposite the reading device for the coded information, the stray currents which the latter may receive are completely eliminated owing to the fact that the logical circuits $1_1$ to $1_{16}$ remain blocked permanently by reason of the absence of energisation of the photo-electric cell $c_0$ under these conditions. Still more complete elimination of stray currents can be obtained by inserting threshold circuits at the outputs of the cells $c_1$ to $c_{16}$. The arrangement described above also has the advantage of eliminating any disturbance which might result from slight faults in the alignment of the various digits recorded on each of the lines $a$ to $g$ of each field of the film F.

The reading device Lc for the coded information which is incorporated in the cinematographic projector P comprises in sixteen outputs 1 to 16 (FIGURE 3) of which those associated with photo-electric cells ($c_1$ to $c_{16}$ FIGURE 6) energised by the passage of the digits recorded optically on the film F transmit a brief, substantially rectangular pulse ($cU1_1$, in FIGURE 6). The outputs 1 to 14 of the reading device Lc for the coded information are connected directly to the first decoder $D_1$, which decodes the coded references indicating the nature of the pieces of information recorded on the different lines $a$ to $g$ of each field of the film F; when it has decoded the reference characteristic of the nature of the information recorded on one of the different lines $a$ to $g$, the decoder $D_1$ causes a signal to appear at one of its corresponding outputs $a, b, c, \ldots g$.

The different pieces of information which are recorded in code in at least some of the spaces 5 to 16 of the various lines *a* to *g* of each field of the film F will now be described in detail. In line *a*, located immediately in front of the illustration I (FIGURE 2), there is recorded in a digital code, for example binary code, the number of the section of the programme to which the corresponding field of the film F is allocated (No. 13 recorded in simple binary code in FIGURE 2). In line *b*, located immediately after the illustration I, there is recorded a signal designed to initiate a slowing down of the motor $m_p$ of the cinematographic projector P, the use of which will be explained hereinafter. In line *c*, which is separated from line *b* by the tracks *p* recording the sound commentary S, there is no recording other than that, in spaces 1 to 4 of a coded reference designed to produce an erasure signal, the use of which will be indicated hereinafter. Following line *c* there are recorded, in lines *d* to *g* of FIGURE 2, and more particularly in a digital code, the standard answers to the question or problem included in the section in question of the programme, with which answers the student's answer is to be compared. In the example of embodiment illustrated in FIGURE 2, several of these standard answers have been provided. Their significance is as follows: if the student's answer is correct, it may sometimes have been presented in a form which does not coincide exactly with that provided, although there is no mistake on that account; if, for example, the student is to answer the problem posed by an algebraic formula comprising, for example, totals or multiplications of letters, it is obvious that his answer may be correct without, nevertheless, his having arranged the various letters of the sums or products in an arbitrarily prescribed order; in this example, provision will therefore be made to record on the field of the film F reserved for the section in question as many standard answers as there are different ways in which the student may present a correct answer. In the event of his being able to present his exact answer only in a single form, for example the number 700 in the case of the problem posed in FIGURE 2, this sole correct standard answer is recorded on the corresponding field of the film, or particularly in the assembly of transverse lines designated by the reference *d* in FIGURE 2. In the event of the student's answer being wrong, it may, however, be sufficiently close to the correct standard answer or answers for it to be legitimate to give him a mark higher than nought; this will be the case, for example, if the student answers the problem posed in FIGURE 2 by one of the two numbers 7,000 and 70,00, which differ from the correct answer only by the position of the comma; such standard answers will be referred to hereinafter as "typically wrong answers"; in the example illustrated in FIGURE 2, the two typically wrong answers mentioned above are recorded in the groups of lines of the film F which are designated respectively by the references *d'* and *d"*. In this example, the different characters, for example letters, figures, symbols, etc., of the various correct or typically wrong standard answers are recorded separately on different lines of the zones *d*, *d'*, *d"*, ... of the corresponding field of the film F; the rank of each character of a standard answer is moreover recorded, preferably in a digital code, for example binary code, in spaces 5 to 8 of the recording line on which the character in question is itself recorded in any digital code in at least some of spaces 9 to 16 of the same line. The outputs 5 to 8 of the reading device Lc for the coded information are moreover directly connected to the inputs of a decoder $D_2$, the output of which produces signals respectively characteristic of the rank of each character of a standard reply recorded on the film F. In the example of embodiment illustrated in FIGURES 2 and 3, each of the zones, *d*, *d'*, *d"* ... of the field in question of the film F therefore comprises as many lines as the standard answer recorded on this zone comprises characters and the successive readings of the pieces of coded information recorded on these different lines causes the appearance at the output of the decoder $D_2$ of signals which cause the advance step by step of a switch S, the various contacts of which are respectively connected to the various groups of outputs of the store $M_r$; the latter comprises a number of sections equal to the maximum number of characters which may be contained in the answers to the various questions or problems which the teaching programme question comprises (Four in FIGURE 3); of course, each of these sections must have a storage capacity sufficient to record the number of digits which is required for the coded representation of the different characters appearing in the various standard answers (eight digits at the most in the example illustrated in FIGURES 2 and 3), so that each section $M_r$ has a group of several inputs and a group of several outputs.

Following each of the zones *d*, *d'*, *d"* ... in which a standard answer is recorded in code on the film F, there is also recorded on a transverse line *e*, *e'*, *e"* ..., preferably in a digital code, a mark which is allotted to the student's answer in the event of this answer agreeing with the standard answer recorded in the immediately preceding zone *d*, *d'* or *d"* of the film F; in the example illustrated in FIGURE 2, this mark is recorded in a simple binary code in the different spaces of the lines *e*, *e'*, *e"* ... from the fifth (the maximum mark 3 on the line *e* which follows the recording of the correct reply 700, a lower mark 2, on the line *e'* which immediately follows the zone *d'* in which the first typically wrong answer 7,000 is recorded, and finally the still lower mark 1 on the line *e"*, which immediately follows the zone *d"* in which the second typically wrong answer 70,0 is recorded). Each of the lines *e*, *e'*, *e"* ... is itself followed by a line *f*, *f'*, *f"* ..., in the first four spaces of which there is recorded a coded reference indicating that the student's answer is possibly in conformity with the standard answer recorded in the preceding zone *d*, *d'* or *d"* of the film F, while in at least some of the other spaces 5 to 16 of each of the lines, *f*, *f'*, *f"*, there is recorded in a digital code the number of the section of the programme which is then to be communicated next to the student to such extent as his answer is exactly in accordance with the preceding standard answer mentioned (in FIGURE 2 the number of the question to be communicated next is also recorded in a simple binary code; in line *f*, the number is 28, in line *f'* the number is 15 and in line *f"* the number is 16). The zone of each field of the film F allocated to one of the sections of the teaching programme in which the various pieces of coded information are recorded is terminated in the example illustrated in FIGURE 2 by a line *g*, which therefore comes immediately after the line *f"* recording the information relative to the case where the student's answer is in conformity with the second typically wrong answer (recorded in the zone *d"* of the film F), and in the first four spaces of which there is recorded in a binary digital code a coded reference indicating that the student's answer is possibly not in conformity with any of the standard answers recorded on the same field of the film F, while in at least some of the spaces 5 to 16 of the same line *g* there is recorded the number of that section of the programme which is to be communicated next to the student in the event of his answer not being actually in conformity with any of the standard answers provided (in FIGURE 2, the question to be communicated next in this case has the number 14, which is recorded in simple binary code).

Finally, it is appropriate to observe that, in the form of embodiment illustrated in FIGURE 3, the two comparators C and C' provided in the functional diagram of FIGURE 1 are grouped in a single comparator C, the first group of inputs I of which is connected, through the medium of a logical OR-circuit and two logical AND-circuits, on the one hand to the outputs 5 to 12 of the reading device Lc for the coded information, at which the numbers of the various sections of the programme recorded on the film F appear in a digital code, and on the other hand to the outputs 9 to 16 of this reading device Lc, at which the various characters of the different standard answers recorded on the film F also appear in coded form, while its second group of inputs is connected, through the medium of a logical OR-circuit, on the one hand, directly to the output of the store $Mn$ in which the number of the programme to be communicated next to the student is recorded, and, on the other hand, through the medium of a logical AND-circuit, to the movable arm of the selector S, which explores step by step the groups of outputs of the store $M_r$ in which the student's answer is recorded, corresponding respectively to the various characters of this answer.

In the example of embodiment illustrated in FIGURES 2 and 3, the cinematographic film F used preferably has a width sufficient, for example a width 70 mm., to enable the different digits necessary for the coded recording of a piece of information to be aligned on one and the same transverse line $a$ to $g$ of the film, as illustrated in FIGURE 2, the various photo-electric reading cells being also in this case aligned on one and the same horizontal line, for example, as shown in FIGURES 4 and 5. In other forms of embodiment, in particular those in which the sound commentary S is not recorded on the cinematographic film F on which the illustrations I and the pieces of coded information associated with the various sections of the programme are optically recorded, it is possible to use a film F of smaller width, for example 35 mm., on which the various digits required for the coded recording of a complete piece of information are distributed on two successive transverse lines of the film. In this embodiment, the photo-electric cells of the reading device for the coded information must then be disposed in two parallel lines, the first of which is preceded by the single cell $c_o$ (FIGURE 6) designed to detect the spots recorded in the initial spaces 0.

Of course, the allocation of the various transverse lines $a$ to $g$ of each field of the film F corresponding to a given section of the programme, and also of the various spaces 1 to 16 of each of these lines, to the recordings of the various pieces of coded information associated with the section in question of the programme may differ considerably from that illustrated and described hereinbefore; in any case, the connections between the reading device Lc for the coded information, on the one hand, and the decoders $D_1$, $D_2$ and the comparator C, on the other hand, must be adapted to the method of location chosen, as will be obvious to those skilled in the art.

A description will now be given hereunder of an operating cycle of the machine of the invention, of which a general diagram is shown in FIGURE 3, between two successive instants at each of which the motor $m_p$ of the cinematographic projector P is stopped by an order, recorded simultaneously in a store $Ma$, in such manner that the illustration I of that section of the programme which is to be communicated next to the student, and the number of which has been previously selected in a manner which will be indicated hereinafter, is in a fixed projection position in the said projector P.

The order for stopping the motor $m_p$ of the projector P which is recorded in the store $Ma$ is immediately transmitted to the input of a store $Md$, the output of which immediately transmits, or transmits with a suitable delay, a starting order to the motor $m_L$ associated with the reading device Ls for the recording tracks $p$ of the sound commentary S on the film F. The sound commentary is therefore then read to the student by the device Ls at the same time as he is able to look at the illustration I projected on the screen E by the projector P. The reading by the device Ls of the recording of the signal $\sigma$ on the film F indicating the end of the sound commentary causes the erasure of the starting order of the motor $m_L$ associated with the reading device Ls which was recorded until then in the store $Md$; this motor therefore stops and the device Ls comes to rest. A possibility is offered to the student of hearing this sound commentary again by actuating a special button of the machine, which has not been shown, and which has the effect of causing the backward movement of the film F in the projector P until the loop which has been formed previously by the said film F during the reading of the sound commentary S, in the manner indicated hereinbefore, has been completely taken up, the presence of this loop being detected, for example, by a feeling or sensing device of known type; means are therefore provided for automatically restarting the motor $m_L$ associated with the reading device Ls for the sound commentary until this has come to an end.

The student having generally been invited at the end of the sound commentary to compose his answer, he then causes the recording thereof by the store $Mr$ of the machine by means of the input device G; switches $i$ enable him to erase at will the characters of his answer which he has already recorded in the various sections of the store $Mr$. When the student considers that the answer which he has composed is in its final form, he makes the recording thereof final by actuating a switch $j$, which causes the emission of the electrical signal $\alpha$, which produces the erasure of the stop signal for the motor $m_p$ of the projector P recorded in the store $Ma$.

In the form of embodiment illustrated in FIGURE 3, an improvement has been provided as a result of which a limited time is given to the student for making the recording of his answer by the machine final; to this end the time thus given to the student is recorded in a digital code, for example in the first of the spaces 5 to 16 of line $b$ of the corresponding field of the film F (in FIGURE 2, the indication of a time of 8 minutes is carried in simply binary code on the said line $b$); as soon as the said line $b$ of the field in question of the film F has arrived opposite the reading device Lc for the coded information, the coded value of the limited time given to the student has been transmitted by the corresponding outputs 5, 6 . . . etc. of the reading device Lc to one of the inputs of a logical AND-circuit, the control input of which receives at the same moment a signal from the output $b$ of the decoder $D_1$, while its output acts on the prepositioning inputs of a deducting counter $\gamma$, for example of electromechanical type, which displays the limited time (8 in FIGURE 3). When the signal indicating the end of the sound commentary is read by the device Ls, this signal $\sigma$ is recorded by a store $M\sigma$, the output of which transmits it to one of the inputs of a logical AND-circuit, the other input of which consequently allows the periodic pulses, for example of a period equal to 30 seconds, which are produced by an electronic clock T, to pass; these pulses of the clock T are therefore transmitted from this moment to the deducting input of the counter $\gamma$; when the latter has been brought to zero, one of its outputs transmits through the medium of a logical OR-circuit a signal which simulates the signal $\alpha$ which is to be started by the student in order to make the recording of his reply final.

As the signal $\alpha$ has the effect of erasing the stop order for the motor $m_p$ of the projector P which is recorded in the store $Ma$, the said motor $m_p$ causes the film F to advance again; this advance of the film F first causes the taking up of the loop which it has formed in the course of the reading of the sound commentary by the device Ls.

Finally, when the pieces of coded information recorded on the line $c$ of the film F which follows the zone S in which the sound commentary which has just been read is recorded come opposite the reading device Lc for the coded information, the output C of the decoder $D_1$ transmits the erasure signal to the erasure inputs of a store Mc, the recording input of which is connected to the output $o$ of the comparator C through the medium of a logical AND-circuit, and of the store $Mn$ in which the number of the section of the programme previously communicated to the student was recorded. When the advance of the film F in the projector P is continued, the various lines $d$ on which the various characters of the first standard answer, which is the correct answer (700), are respectively recorded in coded form pass in succession in front of the reading device Lc for the coded information. When, for example, the first line d passes opposite the reading device Lc, the outputs 5 to 8 of the reading device Lc transmit the number (1) of the rank of the corresponding character of the first standard answer to the decoder $D_2$, the output of which itself transmits, through the medium of a logical AND-circuit, the control input of which then receives a signal from the output d of the decoder $D_1$, a signal which has the effect of placing the arm of the selector S on its contact or group of contacts connected to the group of outputs of that section of the store Mr in which the student has previously recorded the first character of his reply; this first character recorded in the store Mr is thus transmitted in coded form to the second group of inputs II of the comparator C through the medium of the logical OR-circuit and of the logical AND-circuits, the control input of which also receives a signal from the output d of the decoder $D_1$. At the same time, the outputs 9 to 16 of the reading device Lc transmit to the first group of inputs I of the comparator C, in coded form, the first character of the first standard answer recorded on the film F, through the medium of a logical OR-circuit and of a longical AND-circuit, the control input of which simultaneously receives a signal from the output d of the decoder $D_1$. When each of the following lines d of the field in question of the film F passes in turn opposite the reading device Lc, the output of the decoder $D_2$ emits a signal which places the arm of the selector S on the group of outputs of that section of the store Mr through which is recorded the character of the student's answer of the same serial number as the character of the first standard answer recorded on the line in question of the film F, so that these two characters of the same serial number are presented simultaneously as the groups of inputs I and II of the comparator C. If it is found that the student's answer does not agree with the first standard answer recorded on the film F, that is to say if, in the example considered, it is not strictly correct, the output o of the comparator C produces a signal, which transmitted to the input of the store Mc through the medium of the logical AND-circuit, the control input of which also receives a signal from the output d of the decoder $D_1$; it is sufficient for this purpose that one of the characters of the student's answer differs from the corresponding character of the first standard answer which is compared with it. When the following lines e and f of the film F then pass in succession opposite the reading device Lc, the signal present at the output of the sore Mc inhibits two blocking circuits BL and BL' and consequently prevents them transmitting the signals then produced successively by the outputs e and f of the decoder $D_1$. The erasure signal which is then read by the device Lc on the line c' of the film F again erases the information previously recorded in the store Mc. The student's answer is then compared with the second standard answer, which, in the example considered, is the first typically wrong answer, (7,000), a recorded on the four lines of the film F under conditions identical to those previously described. If it is found that the student has in fact given the answer 7,000, no signal is transmitted by the output o of the comparator C to the store Mc in the course of this new comparison; consequently, on the following reading of the line e' of the film F, no inhibition signal is transmitted by the output of the store Mc to the blocking circuit BL, one group of inputs of which is connected to the outputs 5, 6, 7, . . . of the reading device Lc for the coded information, at which there appears the coded value of the mark "2" which is allotted to this first typically wrong answer; as the control input of this blocking circuit BL simultaneously receives a signal from the output e of the decoder $D_1$, the said blocking circuit transmits the coded value of the mark to a decoding counter $\gamma'$, for example of electromechanical type, which displays this mark "2" on the reading of the following line f' of the film, no signal is then present at the output of the store Mc to inhibit the transmission by the blocking circuit BL' of the signal which then appears at the output f of the decoder $D_1$; this signal is consequently transmitted through the medium of an OR-circuit to the control input of a first logical AND-circuit 17, the output of which is applied to the input of the store Mn; as the second group of inputs of the AND-circuit 17 is connected respectively to the outputs 5, 6, 7, etc. of the reading device Lc for the coded information, at which outputs there therefore appear the signals representing in coded form the number of one of the later sections of the programme, which is recorded in at least some of the spaces 5 to 16 of the line f' of the film, this number is recorded through the medium of the said first logical AND-circuit 17 in the store Mn as the number of the later section of the programme to be communicated next to the student. Simultaneously, the output of the blocking circuit BL' transmits a signal to a store MV, the output of which actuates a green-coloured signal or indicator V, the lighting up of which indicates to the student that his answer agrees with one of the standard answers provided; however, as the standard answer with which the student's answer agrees is not the correct answer, but the first typically wrong answer, provision is made to cause the simultaneous lighting up of an indicator R of another colour, for example red; this lighting up is produced by the output of a store Mr, the input of which receives through the medium of an OR-circuit a signal produced at the same moment by the output 13 of the reading device Lc, by reason of the fact that a digit is recorded to this end in the space 13 of the line f' of the film F. On the other hand, no digit is recorded in the space 13 of the line f of the film, so that only the green indicator V lights up if the student's answer agrees with the first standard answer which is the correct answer.

The improvement which has been described hereinbefore for imposing a maximum value on the time taken by the student to compose his answer and make the recording thereof final also provides display of the value of the time actually taken by the student to complete these operations; in fact, this time is equal to the difference between the preset value displayed by the counter $\gamma$ and the value displayed by this deducting counter when the student transmits the signal $\alpha$ which produces the final recording of his answer. For this purpose, this signal $\alpha$ is transmitted through the medium of a longical OR-circuit to the erasure input of the store M$\sigma$, so that it has the effect of blocking the logical AND-circuit which previously transmitted the pulses of the clock T to the deducting counter $\gamma$. In a preferred form of embodiment of the teaching machine according to the invention, the display means of this counter $\gamma$, from the indication of which the time taken by the student to compose his answer can easily be deduced, as well as that of the counter $\gamma'$, provided for displaying the mark allotted to the student, and a display device A for the student's answer which is supplied, for example, by the outputs of the store Mr in which the said answer is recorded and of which various forms of embodiment will be described hereinafter, are disposed in the range of a camera $\phi$, the start of which is controlled automatically by the signal which appears, in the example hereinbefore considered, on the reading of the line f' of the film at the control input of the first logical AND-circuit 17, the output of which is connected to the input of the store Mn; this same signal then controls the automatic advance of the film which the camera $\phi$ is loaded. Thus, photographic recordings of the various elements of the student's answers to the questions or problems included in the sections of the programme which have been communicated to him in succession are obtained on one and the same film.

If on the other hand, we assume that the student's answer does not agree with any of the standard answers recorded on the corresponding field of the film F, no signal appears at the control input of the first logical AND-circuit 17 until the last line $g$ of the said field of the film F is read; in this case, a signal which has appeared at the output of the store Mc in the course of the correction of the last standard reply ($d''$ in FIGURE 2) permits the transmission to the control input of the first logical AND-circuit 17, through the medium of the logical OR-circuit and of a second logical AND-circuit 18, of the signal which is transmitted to the second input of the latter by the output $g$ of the $D_1$ on the reading of the line $g$ of the film F. The signal which then appears at the output of the second logical AND-circuit 18 is then transmitted through the medium of a logical OR-circuit to the store M$r$, which only causes the lighting up of the red indicator or signal R; simultaneously, the signal which is transmitted to the control input of the first logical AND-circuit 17 starts the camera $\phi$, which records the results displayed by the devices $\gamma$, $\gamma'$ and A, the counter $\gamma'$ having obviously remained in this case at the value zero. Of course, the first logical AND-circuit 17 transmits to the store M$n$ the coded number of the later section of the programme which is recorded on the line $g$ of the corresponding field of the film and which then appears in the form of coded signals at the outputs 5, 6, 7, etc. of the reading device Lc (section number 14 in the example illustrated in FIGURE 2). As soon as a signal indicating either that the student's answer agrees with one of the standard answers recorded on the corresponding field of the film F, or that the said answer by the student does not agree with any of these standard answers, appears at the control input of the first logical AND-circuit 17, this signal is also transmitted to a store M$i$, the output of which inhibits the output $c$ to $g$ of the decoder $D_1$. Consequently, when the film F continues its advance in the projector P and the various fields respectively allotted to the following sections of the teaching programme pass in front of the reading device Lc for the coded information, signals appear only at the outputs $a$ and $b$ of the decoder $D_1$; moreover, every time that the number of one of the said later sections of the programme which is recorded on the line $a$ of the field of the film F allotted to this section is read, this number is transmitted in coded form by the outputs 5 to 12 of the reading device Lc to the first group of inputs I of the comparator C through the medium of the logical AND-circuit, the control input of which receives precisely that signal which appears simultaneously at the output $a$ of the decoder $D_1$; however, the number of the later section of the programme which is to be communicated next to the student is permanently transmitted in coded form by the outputs of the store M$n$, and through the medium of the logical OR-circuit, to the second group of inputs II of the comparator C; as soon as there is identity between the section numbers presented at its two groups of inputs, the comparator C ceases to produce at its output $o$ a signal which prohibited in the other cases, through a blocking circuit BL'', the transmission of the signal produced by the output $a$ of the decoder $D_1$ to a store M1 in which the signal is then registered and then transmitted to a circuit controlling the slowing down of the motor $m_p$ of the cinematographic projector P. On the reading of the following line $b$ of the same field of the film, the signal which appears at the output $b$ of the decoder $D_1$ is transmitted to the store M$a$ through the medium of a logical AND-circuit, the control input of which receives a signal from the output of the store M1; the output of the store M$a$ immediately transmits this signal to the circuit controlling the stopping of the motor $m_p$ of the projector P, which consequently stops turning at the precise instant when the illustration I of that section of the programme which is to be communicated next to the student is exactly in the fixed projection position. The signal recorded in the store M$a$ also causes the erasure of that recorded in the store M1; it is the signal $\alpha$ which the student will transmit when he desires to make the recording of his new answer final which will then cause the erasure of the signal recorded in the store M$a$, and consequently the restarting of the motor $m_p$ of the projector P. The signal recorded in the store M$a$ also causes the erasure of that recorded in the store M$i$, so that the prohibition on the outputs $c$ to $g$ of the decoder $D_1$ then ceases.

It is expedient to observe that the form of embodiment hereinbefore described of the teaching machine according to the invention can easily be adapted to the method of teaching which consists in presenting to the student, for example on the illustration I of the section of the programme which is communicated to him, various answers from among which he is to choose the correct answer to the question or problem associated with that section of the programme; in fact, it is then sufficient in this case to provide each of the standard answers proposed to the student with a reference, for example a coded reference, which the student must use to designate that one of the answers which he has chosen and which will then be compared by the comparator C with the designation of the correct standard answer recorded on the corresponding field of the film F.

In the form of embodiment of the teaching machine according to the invention which is shown in FIGURE 3, there is indicated inside the dash-line rectangle $R_1$ a variant of the means for recording the successive answers given by the student; these means consist of a flexible tape passing at uniform speed through a punching device $\pi$, which is started in succession by the groups of outputs of the store M in which the student's answer is recorded, which corresponded to the various characters of the said answer, through the medium of the switch S. The motor $m\pi$ for advancing the tape to be punched is energised by the signals appearing at the output $d$ of the decoder $D_1$ on the comparison of the student's answer with each standard answer recorded on the corresponding field of the film F, so that the advance of the said punched tape produced by its motor $m\pi$ is synchronised, through the medium of the selector S with the successive recordings of the various characters of the student's answer by punching of the said tape by the punching device $\pi$. Moreover, the signal appearing at the store M$\sigma$ between the end of the reading of the sound commentary and the instant of emission of the signal $\alpha$, either by the student or by the output of the deducting counter $\gamma$, also ensures the energisation through the medium of a logical OR-circuit, of the motor $m\pi$ advancing the tape to be punched; if the latter is provided from the start with equidistant perforations, the time taken by the student to compose his answer and make the recording thereof final is recorded automatically on the punched tape by the number of equidistant perforations which it presents between the recordings of the last character of the student's preceding answer and the first character of his following answer; it is also possible, however, to cause such equidistant perforations to be produced on the tape by the punching device $\pi$ itself by causing it to start, through the medium of a logical OR-circuit, through the periodic pulses of the clock T, which appear at the output of the logical AND-circuit when the control input of the latter receives a signal from the output of the store M$\pi$. In a variant of the form of embodiment of FIGURE 3 which has been indicated inside the dash-line rectangle $R_2$ of this figure, the sound commentaries of the various sections of the programme are not recorded on the film F on which the illustrations of the said sections and the pieces of coded information which are associated are recorded; on the contrary, the machine comprises a tape recorder which is loaded with a magnetic recording tape, successive field or portions of which are respectively allotted to the sound commentaries of the various sections of the programme, each of these fields or portions being referenced or marked by a coded number, preferably that allotted to the same section on the cinematographic film; the reading device for the coded numbers of the various fields or portions of the recording tape, which has been designated by the reference $L'c$ inside the rectangle $R_2$ of FIGURE 3, is connected to the first group of inputs I of the comparator C through the medium of the logical OR-circuit and of a logical AND-circuit, the control input of which receives the signals appearing in the course of the controlling of the programme and the output $b$ of the decoder $D_1$; the control circuit of the motor $m_M$ of the tape recorder is moreover connected to the output $o$ of the comparator C through the medium of another logical AND-circuit, the control input of which also receives the signals appearing at the output $b$ of the decoder $D_1$. As soon as the motor $m_p$ of the cinematographic projector P is stopped, on the passage in front of the reading device $L_c$ for the coded information, of the line $b$ of the field of the film of which the line $a$ has previously caused a slowing down of the said motor $m_p$, the motor $m_M$ of the tape recorder is started by the signal which is transmitted to it by the output $o$ of the comparator C, by reason of the fact that the section number read by the device $L'c$ on the tape of the tape recorder and presented to the first group of inputs I of the said comparator C generally differs from the number of the section to be communicated next to the student, which is presented by the output of the store $Mn$ to the second group of inputs II of the said comparator C. The tape of the tape recorder therefore passes in front of the reading device $L'c$ as far as the level of the coded number of the section to be communicated next to the student, the transmission of which to the group of inputs I of the comparator C causes the disappearance at the output $o$ of the latter of the signal which energised the motor $m_M$ of the tape recorder up to that point. The said motor $m_M$ of the tape recorder is then restarted, preferably at reduced speed, in order to permit the reading of the sound commentary by the magnetic head of the said recorder. The automatic starting of this reading stage is not illustrated in FIGURE 3. The tape recorder used may be of conventional type, with a narrow tape having one or more longitudinal tracks, one of which, for example, is reserved for the magnetic recording of the coded numbers of the various sections of the programme, but preferably a tape recorder is used which is provided in known manner with a head which oscillates transversely of a wide recording tape, for example along paths in the form of circular arcs; FIGURE 7 shows a wide magnetic recording tape $F'$ of this kind, the base or support of which is constituted, for example, by a paper tape and on which the successive magnetic tracks in the form of circular arcs are shown at $p'$; all the tracks $p'$ corresponding to the sound commentary of one and the same section of the programme are read by the said tape recorder of known type in alternately opposite directions, the tape $S'$ being moved on in the direction of the arrow 22, for example by toothed members coming into engagement with lateral perforations in the tape $F'$, at the end of the reading of each of the tracks $p'$ by a distance corresponding to the interval between two successive tracks. In front of, or if required behind, the assembly of tracks $p'$ of each sound commentary recorded on the tape $F'$ the number of the corresponding section of the programme is marked, preferably in a digital code, for example on the back of the paper tape, which is not covered with magnetic material; these markings $a'$ are constituted, for example, by black dots standing out from the lighter background of the tape $F'$ and which can be read optically, in particular by suitably disposed photo-electric cells: of course, the markings corresponding to the number of a section can be off-set on the tape in any manner whatsoever with respect to the assembly of tracks $p'$ of the sound commentary corresponding to the section.

In the variant which is illustrated in FIGURE 8, instead of the sound commentaries of the various sections of the programme being recorded on the same cinematographic film F and the illustrations I of the said sections of the programme and the coded information which is associated therewith, they are recorded on a closed loop of the film $F''$ along different parallel longitudinal tracks $p''$, with which there are associated an equal number of independent reading devices; in the example illustrated in FIGURE 8, each of these reading devices for the various parallel sound tracks comprises a small electric lamp $b_1$, $b_2, b_3 \ldots$, which is supplied by one of the outputs of a decoding device $D_3$, the various inputs of which receive the coded number of the sound commentary to be communicated; the light beam produced by that one of the lamps $b_1, b_2, b_3 \ldots$ which is lit is modulated in intensity or in width by the sound track $p''$ passing in front of it during the continuous advance of the loop of film $F''$ and is then directed by an optical device, such as a mirror, onto a single photo-electric cell P, the output signals of which are applied in known manner to a loudspeaker through the medium of suitable amplifiers. The motor driving the loop of the film $F''$ is started automatically, for example by the stop signal for the motor $m_p$ advancing the film in the cinematographic projector P, and then, at the end of the reading of the sound commentary, it is also stopped automatically, for example by the reading of a special signal recorded a little in front of the commencement of each sound track $p''$. As this construction permits only a limited number of different sound commentaries, each of them can be used for several different sections of the teaching programme; a reference number is therefore preferably provided which is different from the numbers of the various sections of the programme and which is recorded, preferably in a digital code, on each of the fields of the film F corresponding to sections for which this same sound commentary is to be read; this recording of the number of the sound commentary of the section to be communicated next to the student can be effected, for example, in the free spaces of the lines such as $e$ and $f$ of the film F which follow the recordings $d, d', d'' \ldots$ of the various standard answers, or else on special lines inserted between the recordings of the said standard answers.

Various forms of embodiment of the input device G by means of which the student can record his answer in the store $Mr$ will now be described with the aid of FIGURES 9 to 12.

If required, the input device G may be constituted by a number of wheels, such as that shown diagrammatically in FIGURE 9, which is equal to the maximum number of characters contained in the longest of the standard answers provided; each of these wheels 47 has on its periphery 48 all the characters to be selected by the student and it is coupled to a device, in particular an electric device, for coding its angular position; in the example illustrated in FIGURE 9, the device for coding the angular position of the wheel 47 is constituted essentially by concentric circular tracks 49, the number of which is equal to that of the digits required for coding the various characters presented by the periphery 48 of the wheel 47; a brush, which is not shown in FIGURE 9, co-operates with each of these tracks 49; the tracks 49 each comprise a given succession of alternately conductive and insulating sections, the conducting sections being all connected electrically to a common connection, which is lead back to a ring such as 50 on which there rubs permanently a common brush, also not shown in FIGURE 9; the various brushes which co-operate with the various tracks 49 being connected by independent circuits to one of the poles of a source of voltage, not shown in FIGURE 9, the other pole of which is connected to the common brush, a current will only pass through those of these independent circuits which correspond to brushes in contact with conductive sections of the corresponding tracks 49; it is the arrangement of the alternately conductive and insulating sections of each of the tracks 49 which makes it possible to collect, in the above mentioned independent circuits, currents the combination of which represents in code that one of the characters shown on the periphery 48 of the wheel 47 which occupies a given position, for example, opposite a display window or opening. This wheel device therefore has the advantage of simultaneously ensuring the functions of the input device G of the store Mr and of the display device A which are provided in FIGURE 3 for ensuring the recording and display of the student's answer. Moreover, it has the advantage of enabling the student to correct easily any character of his answer, but it has the drawback of limiting the number of characters which can be placed at the disposal of the student on each of the wheels 47 to about ten.

Figure 10:
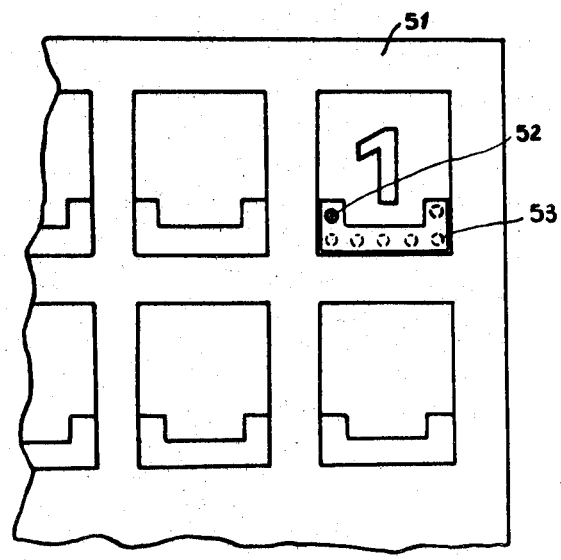
FIGURES 10 and 11 show another form of embodiment of the means with which the student is to compose his answer and store it.
Figure 11:
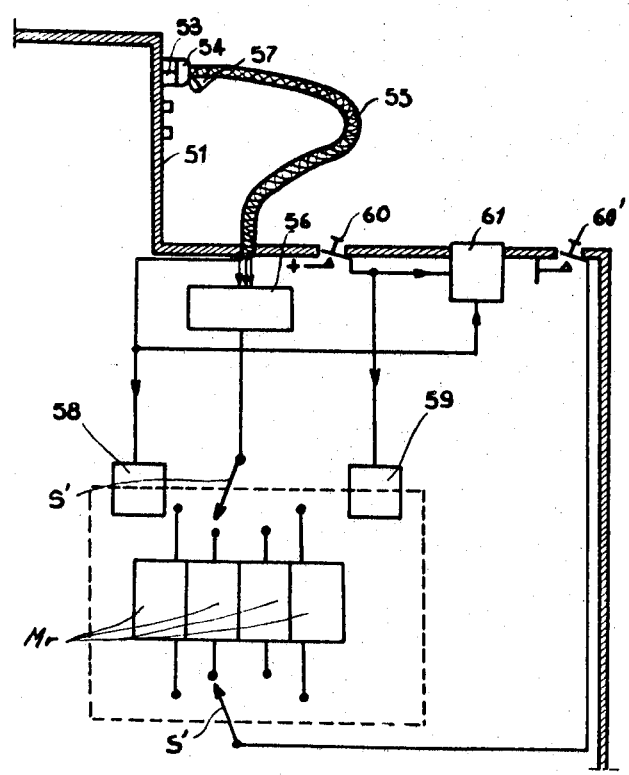

In the form of embodiment of the input device G which is shown diagrammatically in FIGURES 10 and 11, the machine has on its front panel a chart of the various characters from among which the student must choose those making up his answer and with each of which there is associated a coded designation constituted by fixed optical signals; FIGURE 10 shows a part of this chart 51 and the coded designation associated with the FIGURE 1; in the example illustrated, the designation is a digital one in which each digit is represented by a luminous spot 52 of given position (shown in broken lines below the FIGURE 1 are the positions of the various digits which are absent from the designation of this figure in the simple binary code). Opposite the coded designation of each character a guide piece 53 (see in particular FIGURE 11) is fixed to the chart 51 in such manner as to enable a reading device 54 to be engaged therein at will, in such manner that it always occupies the same position with respect to the various digits of the coded designation of the corresponding character. In a first form of embodiment of this reading device, the letter comprises a number of photo-electric cells equal to the maximum number of digits which can be contained in the coded designation of each of the characters of the chart 51, these various photo-electric cells being disposed in the reading device in such manner that each of them can be illuminated only by the fixed optical signal corresponding to one of the digits; the outputs of these various photo-electric cells are connected to the body of the machine by conductors extending through a flexible tube 55 (see FIGURE 11). In another form of embodiment, the photo-electric cells respectively associated with the various digits of the coded designation of each character of the chart 51 are disposed in the body itself of the machine and the light fluxes produced respectively by the fixed optical signals corresponding to the various digits opposite which the reading device 54 has been disposed are respectively transmitted to the said photo-electric cells contained in the body of the machine by an equal number of optical filaments or bundles of optical filaments extending through the flexible tube 55. In both of the forms of embodiment which have just been described, the outputs of the photo-electric cells are applied to the inputs of amplifiers 56 located in the body of the machine and the outputs of these amplifiers are connected to the movable arm of the switch S′, the various groups of contacts of which are themselves respectively connected to the various groups of inputs of the store Mr provided for recording the various characters of the student's answer; the reading device 54 is moreover provided with a trigger switch 57 which, when it is actuated by the student, has the effect, on the one hand, of connecting the outputs of the photo-electric cells to the inputs of the amplifiers 56, and, on the other hand, of energising with a certain delay the advancing motor 58 of the switch S′, in such manner as to cause its moveable arm to pass onto the following group of contacts. In FIGURE 11, means are also provided for enabling the student to erase any one of the characters of his answer which he has previously recorded in one of the sections of the store Mr; to this end, the switch S′ is provided with a return motor 59 which the student can operate step by step by means of a push button 60, which also has the effect of actuating in the sense of deduction a counter 61 displaying the serial number of the character to which is allotted that section of the store Mr of which the group of inputs is now selected by the switch S′; when the student, using the push button 60, has brought the switch S′ onto the group of inputs of that section of the store Mr in which the character of his answer which he desires to correct is recorded, he causes the erasure of the recording of this character in the said section of the store Mr by actuating a key 60′, which is connected to a second moveable arm of the switch S′ which, in synchronism with its first arm, selects the erasure inputs of the various sections of the store Mr which are respectively allotted to the various characters of the answer to be recorded.

In a particularly advantageous form of embodiment of the input device G which has just been described, the chart of the various characters from among which the student must choose those making up his answer, and with each of which there is associated a coded designation is included in illustration I (see 51′ in FIGURE 2) of each section of the programme which is recorded on the film F, so as to be projected with the said illustration; in this case, of course, the various guide elements 53 (FIGURES 10 and 11) provided for the reading device 54 must be fixed to the screen E (FIGURE 1) onto which the projector P projects in succession the illustrations I of the various sections of the programme. The essential advantage of this form of embodiment resides in the possibility of adapting the chart of the various characters from among which the student must choose those making up his answer to a certain question or a certain problem, to this question or problem. Generally speaking, the forms of embodiment of the input device G which was shown in FIGURES 10 and 11 all have the advantage of making it possible, with rather simple technical means, to offer to the choice of a student, for composing his answer, a chart comprising a large number of different characters.

In the form of embodiment of the input device G which is shown in FIGURE 12, the student designates the various characters of his answer in accordance with a certain vocal code, that is to say in order to designate a given character, he emits one or more successive sounds in accordance with a code which is indicated to him by a fixed chart, or else projected at the same time as the illustration of the corresponding sections of the programme. In the case where a single sound is allotted to each character, this sound is transmitted by a microphone 62 to an identification device 63 which delivers a signal at that one of its outputs 63′ which is associated with the character corresponding to the sound emitted by the student; this signal is transmitted to a coder 64, which causes signals representing the character chosen by the student in a certain digital code to appear at its various outputs; the transfer of these coded signals to the group of inputs of the section of the store Mr in which the character which the student has just chosen is to be recorded is ensured by a change-over switch S′ as in the form of embodiment of FIGURE 11; the advance of the change-over switch S′ and its possible backward movement for corrections of the recordings already made are controlled vocally by the emission by the student of special sounds from which the identification device 63 derives signals energising the motors 58 and 59 of the said change-over switch S′. Another special sound can be provided for rendering the recording of the student's answer in the store Mr final. It is also possible to cause each character to be designated by the emission of a plurality of successive sounds; in this case, the coder 54 is no longer necessary, but the composition of the answer by the student is more laborious. U.S. Patent Nos. 3,037,076 and 3,037,077 to Williams et al. are exempletive of speech-to-digital converters which could be used in the above-described vocal-responsive input means.

It is expedient to observe that the change-over switches S', S associated with the various inputs or outputs of the store Mr, both in FIGURE 12 and in FIGURES 3 and 11, have been shown in the form of electromechanical selectors only in order to facilitate the description of their respective functions; according to the invention, they are preferably constituted by electronic circuits, in particular transistorised electronic circuits, having equivalent function.

Finally, the input device G of the teaching machine according to the invention can be designed in such manner as to enable the student to write his answer in manuscript or typewritten form; the input device G must then comprise means for deriving from the manuscript or typewritten characters of the student's answer, coded electrical signals identifying these characters, which are then recorded in the store Mr. There are various known constructions of these means for identifying graphic characters, for example, U.S. Patent No. 3,058,093 to Vernon et al.

Various forms of embodiment of the display device A (FIGURE 3) for the answer which the student records in the store Mr by means of the input device G will now be described with the aid, in particular, of FIGURES 13 to 17.

The display device A may first of all be of the type of that described in French Patent 1,342,990 of Aug. 30, 1962; this known device differs from that form of embodiment previously described of the input device which is provided with character or symbol wheels, such as that shown in FIGURE 9, only by the fact that each of the said wheels is orientated by a servo-mechanism controlled by the digital signals which are supplied to it in particular by the corresponding group of outputs of the input device G; a display device of this kind therefore requires a comparator, a first group of inputs of which is connected to the above mentioned group of outputs of the input device G, while its second group of inputs is connected to the various brushes co-operating with the various tracks of the symbol or character wheel in question, the output of the said comparator supplying the error signal of the servo-mechanism orientating the wheel. The same comparator may assist in successively orientating the various wheels intended to display the various characters or symbols of the student's answer; in the case of a machine illustrated in FIGURE 3, the sole comparator C may also be used, by reason of suitable switching means, to ensure the orientation of the various symbol wheels of the display device A. This form of embodiment of the display device A has the important advantage of eliminating the need for an independent store Mr for recording the student's answer, since this recording is effected by the various symbol wheels of the display device A itself.

In the form of embodiment of the display device A for the student's answer which is shown diagrammatically in FIGURE 13, a drum 65 is driven in rotation at constant speed by a motor 66; the lateral surface of the drum 65 has as many circular tracks 67 as the longest standard answer has characters; on each of these circular tracks 67 there are marked the various characters which are offered to the choice of the student; with each circular track 67 there is associated another circular track 67' in which the designations in a digital code of the various characters marked on the tracks 67 are marked in corresponding angular positions. Each of the character or symbol tracks 67 is illuminated by a flash bulb 68 which is set off through the medium of a reversing circuit 69 by the output of a comparator 70; the left-hand group of inputs of each comparator 70 receives coded signals designating the character or symbol chosen by the student from the group of outputs of the corresponding section of the store Mr in which the student's answer is recorded; the output signals of the reading device 71 for the track 67' associated with the track 67 illuminated by the corresponding flash bulb 68 are applied to the right-hand group of inputs of each of the comparators 70.

Figure 15:
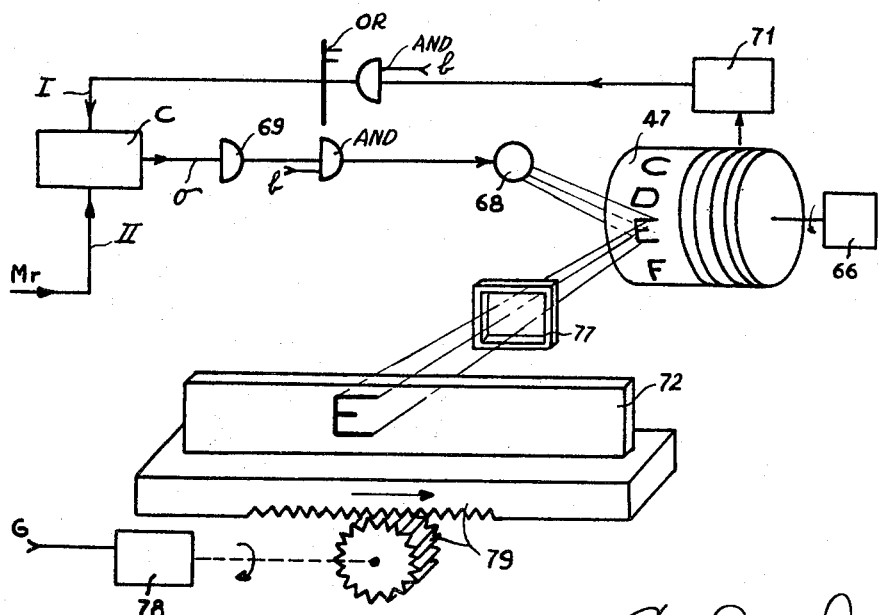
Figure 16:
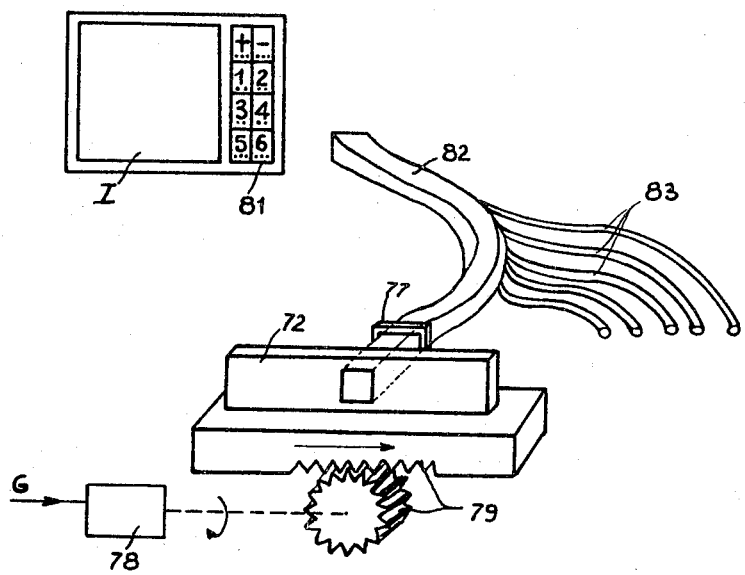
Figure 17:
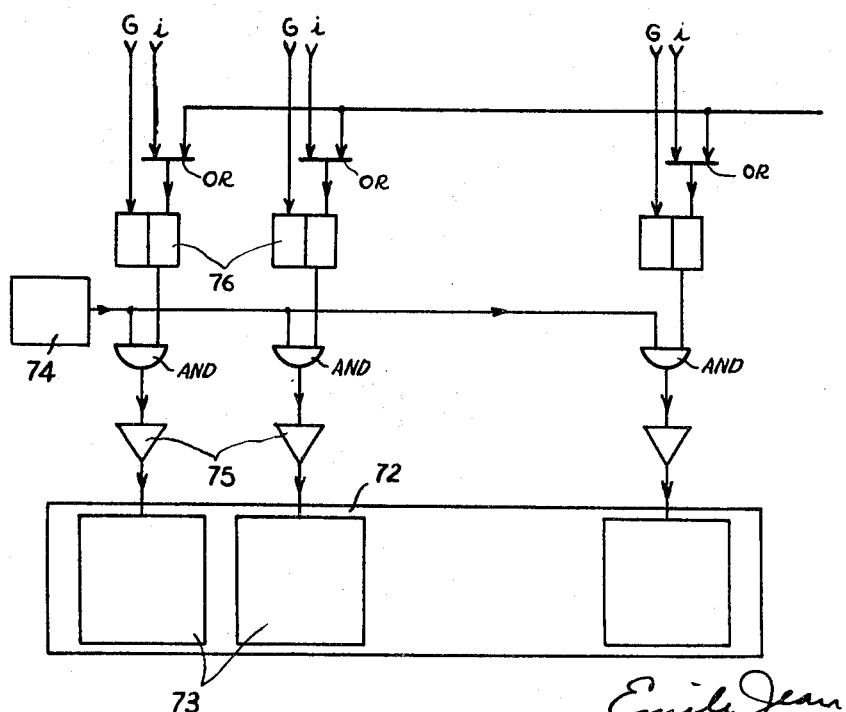
FIGURE 17 shows diagrammatically the polarisation circuit of the electroluminescent panel used in the arrangement illustrated in FIGURES 14 to 16.

The forms of embodiment of the display device A for the student's answer which are shown in FIGURES 14 to 17 all comprise an electroluminescent panel of a special type which is designed in known manner so as to reproduce a luminous image, projected onto it, even after the extinction thereof, as long as a suitable electrical polarisation is applied to it; as shown in FIGURE 17, this electroluminescent panel 72 is divided into different zones 73 which are electrically insulated from one another and are respectively allotted to the display of the different characters or symbols of the student's answer; the electrical polarisations are respectively applied to the different zones 73 from a common source of electric voltage 74 through the medium of logical AND-circuits and amplifiers 75; the control inputs of these logical AND-circuits are respectively activated by the outputs of stores 76, for example bistable flip-flop circuits, each of which stores is designed to record a signal which is produced automatically when the student records the corresponding character of his answer; each of the stores 76 can be returned to zero by the signal which can be transmitted by the student, for example by means of one of the switches $i$ of FIGURE 3, in order to erase the recording of the corresponding character of his answer; the stores 76 can also all be returned simultaneously to zero through the medium of logical OR-circuits by a signal which the student can transmit in order to erase all the characters of the answer which he has previously recorded (of course, these various possibilities of erasure are offered to him only before the emission of the signal $\alpha$ which renders the recordings possibly made in the store Mr final).

Figure 14:
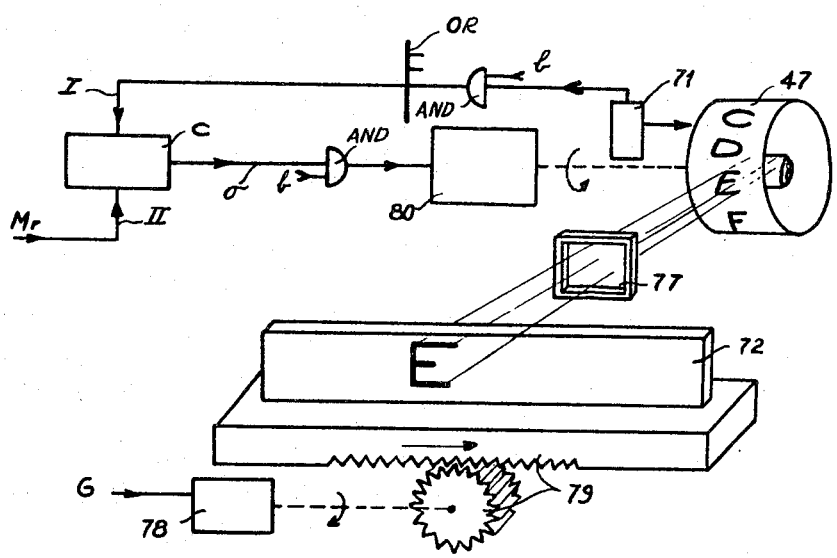
FIGURES 14 to 16 show various forms of embodiment of the display device for the student's answer, each of them comprising an electroluminescent panel of a special type.

In the forms of embodiment of the display device A which are illustrated in FIGURES 14 to 16, the luminous images of the various characters of the student's answer are projected in succession through the same window 77, which is fixed in space, and means are provided for shifting the electroluminescent panel 72 in front of this window 77, by a distance at least equal to the width of the latter, between the instance when the luminous images of two successive characters of the answer are projected; these means are constituted essentially by a motor 78 which is energised, in such manner as to cause the luminescent panel 72 to advance step by step through the medium, for example, of a rack and pinion transmission 79, by the signal produced, in particular automatically, every time the student causes one of the characters of his answer to be recorded in the store Mr. The device which ensures the projection of the various characters of the student's answer in succession onto the electroluminescent panel 72 through the fixed window 77 as the said answer is composed, in such manner that the whole of this answer is displayed on the said electroluminescent panel 72 when the student has recorded the whole of his answer, is designed in different ways in FIGURES 14, 15 and 16. In the forms of embodiment shown in FIGURES 14 and 15, this device comprises a character wheel 47 which is coupled to a device 71 for coding its angular position, that is to say of the type illustrated in FIGURE 9; the various groups of outputs of the store Mr in which the student's answer is recorded are changed over in succession by the recordings of the various characters of the student's answer, by means of a change-over switch such as S (FIGURE 3), to the second group of inputs II of the comparator C, which may be the sole comparator with which the teaching machine is provided, while the first group of inputs of the said comparator C is connected to the outputs of the coding device 71 for the angular position of the character wheel 47, for example through the medium of a logical OR-circuit and a logical AND-circuit, the control input of which receives the signal which appears at the output $b$ of the decoder $D_1$ (FIGURE 3) and which causes the stopping of the motor $m_p$ of the cinematographic projector P. In the form of embodiment illustrated in FIGURE 14, the output $o$ of the comparator C energises a motor 80 through the medium of a logical AND-circuit, the control input of which receives the signal which appears at the output $b$ of the decoder $D_1$ (FIGURE 3) and which stops the motor $m_p$ of the cinematographic projector P, the said motor 80 driving in rotation the character wheel 47. In the form of embodiment illustrated in FIGURE 15, the output $o$ of the comparator C energises the flash bulb 68 through the medium of a reversing circuit 69 and a logical AND-circuit, the control input of which receives the signal which appears at the output $b$ of the decoder $D_1$ (FIGURE 3) and which causes the stopping of the motor $m_p$ of the cinematographic projector P, the said flash bulb 68 being disposed in such manner as to illuminate the character wheel 47 so as to project onto the electroluminescent panel 72 that one of the characters carried by the said wheel which passes opposite the projection window 77, owing to the rotation at constant speed which is imparted to the said character wheel 47 by a motor 66.

In the form of embodiment of the display device A for the student's answer which is illustrated in FIGURE 16, the various characters with which the student is to compose his answer are presented to him on a luminous chart 81 which, for example, can be projected onto the screen E at the same time as the illustration I of the corresponding section of the programme; in order to transmit the luminous image of any one of these characters to the projection window 77 on the electroluminescent display 72, the student has a bundle of optical fibres 82 at his disposal. This form of embodiment of the display device A can therefore be combined in a particularly advantageous manner with the form of embodiment of the input device G for the student's answer which is shown in FIGURES 10 and 11; in this case, the bundle of optical fibres which the student has at his disposal for transmitting the luminous image of the character which he has chosen to the projection window 77 can pass through the flexible tube 55 through which there already pass either the optical fibres 83 designed to transmit to photo-electric cells disposed in the body of the machine the fixed optical signals designating on the chart 81 in coded form the character chosen by the student, or the conductors connecting the photo-electric cells mounted in the reading device 54 (FIGURES 10 and 11) to the amplifiers disposed in the body of the machine.

All the various circuits, in particular the various logical circuits, which enter into the construction of the teaching machine according to the invention can be produced easily, in particular with the aid of semi-conductor devices and of the well known techniques of solid-state electronics.

The present invention may be embodied in other specific forms without departing from the spirit or essential attributes thereof and, accordingly, reference should be made to the appended claims, rather than to the foregoing specification as indicating the scope of the invention.

I claim:

1. A teaching machine, comprising a cinematographic projector, in this projector a film, each of the successive fields of which is allotted to one section of the teaching program including a problem or a question, and is provided with optical recordings of an illustration for said program section and of coded information, comprising at least the proper number of said section, recorded on a first transverse line of said field, a plurality of possible student's standard answers, each having its successive $n$ characters recorded on a same number $n$ of successive transverse lines of said field, the numbers of a same plurality of other program sections, one of which is to be communicated next to the student when having made the corresponding standard answer, each of said number of other sections being recorded on a transverse line of said field between the corresponding standard answer and the next standard answer, plus the number of still another program section, which is to be communicated next to the student when having made no standard answer, said last number being recorded on a transverse line at the end of said field, means for presenting an aural comment when the illustration recorded on said field is projected by means of said projector, input and storing means for the student's answer, having separate sections for the various characters of his answer, sensing means adapted to sense simultaneously all the coded information recorded on a same transverse line of said field, a circuit for starting the movement of said film in contact with said sensing means by a command from said answer input means and for comparing successively each character of said standard answers recorded on said film field with the character of same rank in the stored student's answer, a store for storing one of said numbers of other program sections recorded on said film field under the control of said comparing means, and means for comparing successively the proper numbers of all program sections recorded on said film with said one number of another program section stored in said other section number store and for stopping the film movement with the illustration for said other section being in a fixed projection position in said projector.

2. A machine as claimed in claim 1, comprising a first and a second comparator, each having a first group of inputs connected to said sensing means, a second group of inputs and an output, the second group of inputs of said first and second comparators being respectively connected to said answer storing means and to said other section number store, and a gate inserted between said sensing means and said section number store, the output of said first comparator being connected to said gate for controlling the same whereas the output of said second comparator is connected to said means for stopping the film movement.

3. A machine as claimed in claim 1, in which a coded maximum time allotted to the student for entering his answer to said problem or question is recorded on each field of said film, and which further comprises a pulse deducting counter having an output generating a signal when said counter is reset, the output of said counter being connected to said film movement starting circuit, means to preset said counter according to said allotted maximum time recorded on said film field, a pulse generating clock, means to gate the clock pulses to said preset, deducting counter as soon as a problem or a question has been presented to the student, whereby the film movement is started again when the allotted maximum time has elapsed without the student having entered an answer.

4. A machine as claimed in claim 1, in which a same plurality of coded marks to be respectively allotted to the student when having made one of said standard answers, is recorded on each field of the film, each of said marks being recorded on a transverse line of the field between the corresponding standard answer and the next standard answer, and which further comprises a display device for one of said marks, and means to gate one of these coded marks, recorded on said film field, to said display device under the control of said means for comparing successively the standard answers recorded on said field with the stored student's answer.

5. A machine as claimed in claim 1, in which the aural comment of each program section is recorded along successive substantially transverse tracks in the field of said film allotted to said program section, and said means for presenting the aural comment comprises a reading head, means for reciprocating said head along a substantially transverse line of said film, and means for moving said film in contact with said head while maintaining the illustration recorded on the same film field in a fixed projection position in said projector.

6. A machine as claimed in claim 1, in which the aural comments of all program sections are recorded on a tape, each of the successive fields of which is allotted to one of said program sections, and is provided with a recording of the proper number of said section, and which further comprises means for reading one of the aural comments recorded on said tape, sensing means adapted to sense one of said proper section numbers recorded on said tape, a circuit for starting the movement of said tape in contact with said sensing means by a command from said means for stopping the film, means for comparing successively the numbers of all program sections recorded on said tape with said one number of another program section stored in said other section number store, and for stopping the tape movement with the aural comment for said other section being in a reading position with respect to said reading means.

7. A machine as claimed in claim 6, in which the aural comment of each program section is recorded along successive, substantially transverse tracks in the field of said tape allotted to said program section, and said means to read one of said aural comments recorded on said tape comprises a reading head, means for reciprocating said head along a substantially transverse line of said tape, and means for moving said tape in contact with said head.

8. A machine as claimed in claim 1, in which aural comments for the program sections are recorded on a second film along a plurality of longitudinal tracks, and the coded number of at least one of said tracks is recorded on each field of said first film and which further comprises a same plurality of heads for reading said aural comments recorded on said second film, means for sensing one of said track numbers recorded on said first film, for decoding said one track number, for activating one of said reading heads according to the sensed and decoded track number, and for moving said second film in contact with said reading heads.

9. A machine as claimed in claim 1, in which the input and storing means for the student's answer consists of a plurality of manually rotatable wheels, each of which is provided with a peripheral, visible display of the various characters offered for said student's answer, and of means for converting the various angular positions of said rotatable wheel in coded electrical signals for said various characters.

10. A machine as claimed in claim 1, in which the input means for the student's answer comprises a visible display of a plurality of characters offered for said student's answer, and a same plurality of optical codes respectively alloted to said characters, manually operatable means for sensing one of said optical codes, photoelectrical transducing means for the sensed optical code, and means for step-by-step switching the codes sensed by said sensing means operated by the student, and then transduced, to the successive sections of said answer storing means.

11. A machine as claimed in claim 10, in which said sensing means and photoelectrical transducing means are aggregated in a manually operatable sensing head, and flexible isolated conductors are provided at least for connecting said transducing means to said step by step switching means, said sensing head being further provided with a trigger switch for activating said head and for actuating said step-by-step switching means through at least one of said flexible conductors.

12. A machine as claimed in claim 10, in which flexible, optical guides are provided for connecting said manually operatable sensing means and said photoelectrical transducing means.

13. A machine as claimed in claim 10 comprising further manually operatable means for connecting said transducing means to any desired section of the answer storing means, and for erasing the character of the student's answer previously entered in said desired storing section.

14. A machine as claimed in claim 10, in which the characters offered for the student's answer and the codes respectively allotted to said characters are optically recorded inside of the illustration recorded in each of said film fields.

15. A machine as claimed in claim 1, in which the input means for the student's answer comprises audio-electrical transducing and sound-recognising means for converting vocal sounds emitted in succession by the student for entering the successive characters of his answer, into successive electrical signals, and means for switching said successive electrical signals to the successive sections of said answer storing means.

16. A machine as claimed in claim 1, in which the input means for the student's answer comprises means for writing said answer, pattern-recognising means for converting the various written characters of the student's answer into various electrical signals, and means for storing said various signals in the various sections of said answer storing means.

17. A machine as claimed in claim 1, which further comprises a visual display device for the student's answer stored in said answer storing means.

18. A machine as claimed in claim 17, in which said visual display device for the student's answer comprises a rotatable drum, on said drum a plurality of peripheral series of the characters offered for said student's answer, and a same plurality of circular code sequences, each of which is allotted to one of said character series and has codes for all characters of the corresponding series in a same angular relationship as said characters in said series, a same plurality of flash bulbs, each being disposed for illuminating only one character of one of said series, means for rotating said drum at a constant speed, a same plurality of sensing means, each being adapted to sense only the code of one of said circular code sequences corresponding to the illuminated character of the respective series, a same plurality of comparators each having an output and a first and a second input connected respectively to one of the sections of said answer storing means and to one of said sensing means, and means for triggering respectively said flash bulbs under the control of the respective outputs of said comparators.

19. A machine as claimed in claim 17, in which said visual display device comprises an electroluminescent panel, means to project thereon instantaneously an optical image of the student answer, and means for applying an electrical polarisation on said panel as long as the visual display is desired.

20. A machine as claimed in claim 19, which further comprises a stationary projection window, means for projecting instantaneously through said window, at successive times, optical images of the successive characters of the student's answer, and means for shifting said electroluminescent panel in front of said window, between two of said sucessive times, by a distance adapted to the size of said window.

21. A machine as claimed in claim 20, in which said means for projecting through said window optical images of the characters of the student's answer comprises a rotatable wheel provide with a peripheral series of images of the characters offered for said student's answer and with a circular code sequence having codes for all characters of said series in a same angular relationship as said characters in said peripheral series, said wheel being disposed behind said window in such a relationship therewith that only one optical character of said series on said wheel is projected through said window, means for sensing only the code of said circular code sequence corresponding to the projected character of said series, a comparator having an output, a first input connected permanently to said sensing means, and a second input connected at each of said successive times to a different one of the various sections of said answer storing means, and means for rotating said wheel under the control of the output of said comparator.

22. A machine as claimed in claim 20, in which said means for projecting through said window optical images of the characters of the student's answer comprises a rotatable wheel provided with a peripheral series of images of the characters offered for said student's answer and with a circular code sequence having codes for all characters of said series in a same angular relationship as said characters in said peripheral series, said wheel being disposed behind said window in such a relationship therewith that only one optical character of said series on said wheel is projected through said window, means for sensing only the code of said circular code sequence corresponding to the projected character of said series, a comparator having an output, a first input connected permanently to said sensing means, and a second input connected at each of said successive times to a different one of the various sections of said answer storing means, means for rotating said wheel at a constant speed, a flash bulb for illuminating on said wheel only the projected character of said series, and means for triggering said flash bulb under the control of the output of said comparator.

23. A machine as claimed in claim 20, in which said means for projecting through said window optical images of the characters of the student's answer comprises a visible and luminous display of a plurality of characters offered for said student's answer, a manually operatable sensing head for sensing one of said luminous character images and flexible optical guides for transmitting the luminous image of the character selected by the student from said sensing head to said projection window.

24. A machine as claimed in claim 17, comprising further means for photographing at least said visual display device each time a definitive student's answer is displayed thereby.

25. A machine as claimed in claim 1, comprising further means to record the successive student's answers on a tape by punching the same.

26. A teaching machine, comprising a cinematographic projector, in this projector a film, each of the successive fields of which is allotted to one section of the teaching program including a problem or a question, and is provided with optical recordings of an illustration for said program section and of coded information, comprising at least the proper number of said section, recorded on a first transverse line of said field, a plurality of possible student's standard answers, each having its successive *n* characters recorded on a same number *n* of successive, transverse lines of said field, and a same coded reference being recorded on each of said successive, transverse lines of said field beside the recording of one character of one of said standard answers, the numbers of a same plurality of other program sections, one of which is to be communicated next to the student when having made the corresponding standard answer, each of said number of other sections being recorded on a transverse line of said field between the corresponding standard answer and the next standard answer, plus the number of still another program section, which is to be communicated next to the student when having made no standard answer, said last number of another section being recorded on a transverse line at the end of said field, means for presenting an aural comment when the illustration recorded on said field is projected by means of said projector, input and storing means for the student's answer, having separate sections for the various characters of his answer, sensing means adapted to sense simultaneously all the coded information recorded on a same transverse line of said field, a circuit for starting the movement of said film in contact with said sensing means by a command from said answer input means, a comparator having a first group of inputs connected to said sensing means, a second group of inputs, and an output, connected directly to said circuit for stopping the film movement, a first gate inserted between said answer storing means and the second group of inputs of said comparator, a decoder for decoding said coded reference recorded on said field beside each character of said standard answers, said decoder having an input connected to said sensing means and an output connected to said first gate for controlling the same, a store having a group of inputs and a group of outputs connected directly to the second group of inputs of said comparator, a second gate inserted between said sensing means and the group of inputs of said store, the output of said comparator being further connected to said second gate for opening the same only when the stored student's answer either has coincided exactly with the one of said standard answers, recorded on said field, just compared therewith or has coincided with none of said standard answers previously compared therewith, whereby one of said numbers of other program sections recorded on said film field is stored in said store, and transmitted through its group of outputs to the second group of inputs of said comparator for it being further compared thereby with the numbers of all program sections recorded on said film, the film movement being stopped through said stopping circuit connected to the output of said comparator when the illustration recorded on said film for said other program section is in a fixed projection position in said projector.

27. A machine as claimed in claim 26, in which another same coded reference is recorded on the first transverse line of each film field, beside the proper number of the corresponding program section, and which comprises two further gates inserted between said sensing means and the first group of inputs of said comparator, and a second decoder for decoding said other coded reference recorded on the film beside each section proper number, said second decoder having an input connected to said sensing means and an output connected to one of said two further gates for opening the same only when a section proper number recorded on said film is sensed by said sensing means, the output of said first decoder being also connected to the other of said two further gates for opening the same only when a character of one of said standard answers, recorded on said film, is sensed by said sensing means.

28. A teaching machine comprising a cinematographic projector, in this projector a film, each of the successive fields of which is allotted to one section of the teaching program including a problem or a question, and is provided with optical recordings of an illustration for said program section and of coded information, comprising at least the proper number of said section, recorded on a first transverse line of said field, a plurality of possible student's standard answers, each having its successive *n* characters recorded on a same number *n* of successive, transverse lines of said field, a coded rank number being further recorded on each of said successive, transverse lines of said field, beside the recording of one character of one of said standard answers, the numbers of a same plurality of other program sections, one of which is to be communicated next to the student when having made the corresponding standard answer, each of said numbers of other sections being recorded on a transverse line of said field between the corresponding standard answer and the next standard answer, plus the number of still another program section, which is to be communicated next to the student when having made no standard answer, said last number of another section being recorded on a transverse line at the end of said field, means for presenting an aural comment when the illustration recorded on said field is projected by means of said projector, input and storing means for the student's answer, having separate sections for the various characters of his answer, sensing means adapted to sense simultaneously all the coded information recorded on a same transverse line of said field, a circuit for starting the movement of said film in contact with said sensing means by a command from said answer input means, a comparator having a first group of inputs connected to said sensing means, a second group of inputs, and an output, a selector inserted between the separate sections of said answer storing means and the second group of inputs of said comparator for selecting one of said storing sections, a decoder for decoding said coded rank number recorded on said field, beside each character of said standard answers, said decoder having an input connected to said sensing means and an output connected to said selector for controlling the same according to the decoded rank number, a store, a gate inserted between said store and said sensing means, the output of said comparator being connected to said gate for opening the same only when the stored student's answer either has coincided exactly with one of said standard answers, recorded on said field, just compared therewith, or has coincided with none of said standard answers, previously compared therewith, whereby one of said numbers of other program sections, recorded on said film field is stored in said store, and means for comapring successively the proper numbers of all program sections recorded on said film with said one number of another program section, stored in said other section number store and for stopping the film movement with the illustration for said other section being in a fixed projection position in said projector.

29. A teaching machine comprising a cinematographic projector, in this projector a film, each of the successive fields of which is allotted to one section of the teaching program including a problem or a question, and is provided with optical recordings of an illustration for said program section and of coded information of various predetermined types, comprising at least the proper number of said section, a plurality of possible student's standard answers, the numbers of a same plurality of other program sections, one of which is to be communicated next to the student when having made the corresponding standard answer, plus the number of still another program section, which is to be communicated next to the student when having made no standard answer, each of said coded information being recorded in a first predetermined part of at least one of successive transverse lines of said field, and a coded reference being recorded on a second predetermined part of said one transverse line for characterizing the predetermined type of said coded information recorded on said first part of said one transverse line, means for presenting an aural comment when the illustration recorded on said field is projected by means of said projector, input and storing means for the student's answer, having separate sections for the various characters of his answer, first and second sensing means respectively adapted to sense the coded information recorded on the first predetermined part of one of said transverse line of said field, and the coded information type reference recorded on the second predetermined part of the same of said traverse lines, a circuit for starting the movement of said film in contact with said sensing means by a command from said answer input means, a decoder for decoding the coded information type reference sensed on the predetermined second part of one of said transverse lines, of said field, means for comparing successively each of said standard answers recorded on said field with the stored student's answer under the control of the decoded standard answer references, a store for storing one of said numbers of other program sections recorded on said field under the control of said comparing means and of the decoded other section number reference, and means for comparing successively the proper numbers of all program sections recorded on said film with said one number of another program section stored in said other section number store and for stopping the film movement with the illustration for said other section being in a fixed projection position in said projector, under the control of the decoded proper section number reference recorded on the film field corresponding to said other program section.

30. A machine as claimed in claim 29, in which a coded answer character rank number is further recorded on a third predetermined part of each of said transverse lines of said film field, on which one character of one of said standard answers is recorded on the first predetermined part of said line, and which further comprises a third sensing means and a second decoder for respectively sensing and decoding the coded character rank number recorded on the third predetermined part of one of said transverse lines of said field, a comparator having a first group of inputs connected to said first sensing means, a second group of inputs and an output connected directly to said means for stopping the film movement, a selector inserted between the separate sections of said answer storing means and the second group of inputs of said comparator for selecting one of said storing sections, said selector being controlled by said second decoder according to the decoded character rank number, a first gate inserted between said selector and the second group of inputs of said comparator, said first gate being under the control of the decoded standard answer reference, a second gate inserted between said first sensing means and said other section number store, and a logic unit connected to said second gate for opening the same under the control of the output of said comparator as well as of decoded standard answer reference and other section number references, said other section number store being further directly connected to the second group of inputs of said comparator.

31. A machine as claimed in claim 30, in which a coded erasure signal is recorded on the second predetermined part of a transverse line of said field, preceding the recording of each of said standard answers, and means are provided in said first decoder for transmitting the erasure signal sensed by said second sensing means on a transverse line of said field, to said other section number store and to said logic unit.

32. A machine as claimed in claim 31, in which the logic unit has an input connected to the output of said comparator and an output connected to said second gate, and comprises a store, to which said decoded erasure signal is transmitted by said first decoder, a gate inserted between said logic unit input and said store, and being under the control of the decoded standard answer reference, a logic OR-circuit connected to the output of said logic unit, and a pair of further logic circuits inserted between said store and said OR-circuit, and being under the control of the decoded other section number references.

33. A machine as claimed in claim 32, in which said pair of logic circuits comprises a blocking circuit having an output and being under the control of the decoded reference corresponding to each of said other section numbers recorded on said film field, and an AND-gate, having an output and being under the control of the decoded reference corresponding to the number of still another program section, recorded on said field and which further comprises two signalling devices, and two stores inserted respectively between the outputs of said logic circuits and said two signalling devices, said stores having erasure inputs connected to said means for stopping the film movement.

34. A machine as claimed in claim 30, in which said first decoder comprises separate outputs for all said coded information references, and an input for blocking all said outputs except that for the proper section number reference, and a store is inserted between the output of said logic unit and the blocking input of said first decoder, said store having an erasure input, connected to said means for stopping the film movement.

35. A cinematographic film for use in a teaching machine, comprising a plurality of fields, each of which is allotted to one section of the teaching program including a problem or a question, and is provided with optical recordings of an illustration for said program section, and of coded information, comprising at least the proper number of said section, recorded on a first transverse line of said field, a plurality of possible student's standard answers, each having its successive $n$ characters recorded on a same number $n$ of successive transverse lines of said field, the numbers of a same plurality of other program sections, one of which is to be communicated next to the student, when having made the corresponding standard answer, each of said numbers of other sections being recorded on a transverse line of said field between the corresponding standard answer and the next standard answer, plus the number of still another program section, which is to be communicated next to the student when having made no standard answer, said last number being recorded on a transverse line at the end of said field.

36. A cinematographic film for use in a teaching machine, comprising a plurality of fields, each of which is allotted to one section of the teaching program including a problem or a question, and is provided with optical recordings of an illustration for said program section and of coded information of various predetermined types, comprising at least the proper number of said section, a plurality of possible student's standard answers, the numbers of a same plurality of other program sections, one of which is to be communicated next to the student when having made the corresponding standard answer, plus the number of still another program section, which is to be communicated next to the student when having made no standard answer, each of said coded information being recorded in a first part of at least one of successive transverse lines of said field, and a coded reference being recorded on a second predetermined part of said one transverse line for characterizing the predetermined type of said coded information recorded on said first part of said one transverse line.

References Cited
UNITED STATES PATENTS

| | | | |
|---|---|---|---|
| 2,632,061 | 3/1953 | Begun | 179—100.2 |
| 2,869,876 | 1/1959 | Brasseur | 340—174.1 |
| 3,121,959 | 2/1964 | Uttal | 35—9 |
| 3,121,960 | 2/1964 | Uttal et al. | 35—9 |
| 3,141,243 | 7/1964 | Chapman | 35—9 |
| 3,145,268 | 8/1964 | Whitney | 35—5 |
| 3,191,315 | 6/1965 | Hannah | 35—9 |

EUGENE R. CAPOZIO, *Primary Examiner.*

W. W. NIELSEN, *Assistant Examiner.*